US007720767B2

(12) United States Patent
Ta et al.

(10) Patent No.: US 7,720,767 B2
(45) Date of Patent: May 18, 2010

(54) METHOD AND SYSTEM TO SUPPORT DYNAMIC RIGHTS AND RESOURCES SHARING

(75) Inventors: Thanh Ta, Huntington Beach, CA (US); Mai Nguyen, Buena Park, CA (US); Eddie J. Chen, Rancho Palos Verdes, CA (US); Xin Wang, Torrance, CA (US); Thomas Demartini, Culver City, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 1241 days.

(21) Appl. No.: 11/256,272

(22) Filed: Oct. 24, 2005

(65) Prior Publication Data

US 2007/0094145 A1 Apr. 26, 2007

(51) Int. Cl.
G06F 17/60 (2006.01)
H04K 1/00 (2006.01)
H04L 9/00 (2006.01)

(52) U.S. Cl. .......................................... 705/59; 705/52
(58) Field of Classification Search ........................ None
See application file for complete search history.

(56) References Cited

U.S. PATENT DOCUMENTS 4,159,468 A 6/1979 Barnes et al.

(Continued)

FOREIGN PATENT DOCUMENTS

BR 9810967 A 10/2001

(Continued)

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

(Continued)

Primary Examiner—Andrew J. Fischer
Assistant Examiner—C. Aaron McIntyre
(74) Attorney, Agent, or Firm—Marc S. Kaufman; Stephen M. Hertzler; Nixon Peabody, LLP

(57) ABSTRACT

The invention relates to method for deriving a sub-right from a right, the right comprising a plurality of components, each of which specifies an aspect of the right. A component may be, for example, a principal, an action, a resource, and a condition. The invention also relates to a method for integrating a first right with a second right. Furthermore, the invention relates to a method of sharing rights by deriving a sub-right from a right, allowing use of the sub-right, and integrating the sub-right with the right. In addition, the invention relates to a system to support rights sharing by enabling the derivation of a sub-right from a right, the right comprising plural components each of which specifies an aspect of the right, the system comprising a receiving module for receiving a sub-right, the sub-right comprising plural components each of which specifies an aspect of the sub-right, and a confirmation module for confirming that the values of the components of the sub-right can be derived from the values of the corresponding components of the right. The invention further relates to a method for deriving a sub-right from a pool of rights granted by a grantor to a grantee for controlling use of resources within a computing environment, the computing environment having a mechanism for enforcing rights within the environment to control use of resources in accordance with the rights.

19 Claims, 29 Drawing Sheets

U.S. PATENT DOCUMENTS

| | | | |
|---|---|---|---|
| 4,200,700 | A | 4/1980 | Mäder |
| 4,361,851 | A | 11/1982 | Asip et al. |
| 4,423,287 | A | 12/1983 | Zeidler |
| 4,429,385 | A | 1/1984 | Cichelli et al. |
| 4,621,321 | A | 11/1986 | Boebert et al. |
| 4,736,422 | A | 4/1988 | Mason |
| 4,740,890 | A | 4/1988 | William |
| 4,796,220 | A | 1/1989 | Wolfe |
| 4,816,655 | A | 3/1989 | Musyck et al. |
| 4,888,638 | A | 12/1989 | Bohn |
| 4,937,863 | A | 6/1990 | Robert et al. |
| 4,953,209 | A | 8/1990 | Ryder et al. |
| 4,977,594 | A | 12/1990 | Shear |
| 5,014,234 | A | 5/1991 | Edwards |
| 5,129,083 | A | 7/1992 | Cutler et al. |
| 5,138,712 | A | 8/1992 | Corbin |
| 5,174,641 | A | 12/1992 | Lim |
| 5,204,897 | A | 4/1993 | Wyman |
| 5,247,575 | A | 9/1993 | Sprague et al. |
| 5,260,999 | A | 11/1993 | Wyman |
| 5,276,444 | A | 1/1994 | McNair |
| 5,287,408 | A | 2/1994 | Samson |
| 5,291,596 | A | 3/1994 | Mita |
| 5,293,422 | A | 3/1994 | Loiacono |
| 5,335,275 | A | 8/1994 | Millar et al. |
| 5,337,357 | A | 8/1994 | Chou et al. |
| 5,386,369 | A | 1/1995 | Christiano |
| 5,390,297 | A | 2/1995 | Barber et al. |
| 5,414,852 | A | 5/1995 | Kramer et al. |
| 5,453,601 | A | 9/1995 | Rosen |
| 5,485,577 | A | 1/1996 | Eyer et al. |
| 5,504,816 | A | 4/1996 | Hamilton et al. |
| 5,530,235 | A | 6/1996 | Stefik et al. |
| 5,535,276 | A | 7/1996 | Ganesan |
| 5,553,143 | A | 9/1996 | Ross et al. |
| 5,557,678 | A | 9/1996 | Ganesan |
| 5,564,038 | A | 10/1996 | Grantz et al. |
| 5,619,570 | A | 4/1997 | Tsutsui |
| 5,625,690 | A | 4/1997 | Michel et al. |
| 5,629,980 | A | 5/1997 | Stefik et al. |
| 5,636,346 | A | 6/1997 | Saxe |
| 5,638,443 | A | 6/1997 | Stefik et al. |
| 5,638,513 | A | 6/1997 | Ananda |
| 5,708,709 | A | 1/1998 | Rose |
| 5,715,403 | A | 2/1998 | Stefik |
| 5,745,879 | A | 4/1998 | Wyman |
| 5,764,807 | A | 6/1998 | Pearlman et al. |
| 5,765,152 | A | 6/1998 | Erickson |
| 5,787,172 | A | 7/1998 | Arnold |
| 5,790,677 | A | 8/1998 | Fox et al. |
| 5,812,664 | A | 9/1998 | Bernobich et al. |
| 5,825,876 | A | 10/1998 | Peterson |
| 5,825,879 | A | 10/1998 | Davis |
| 5,838,792 | A | 11/1998 | Ganesan |
| 5,848,154 | A | 12/1998 | Nishio et al. |
| 5,848,378 | A | 12/1998 | Shelton et al. |
| 5,850,443 | A | 12/1998 | Van Oorschot et al. |
| 5,915,019 | A | 6/1999 | Ginter et al. |
| 5,917,912 | A | 6/1999 | Ginter et al. |
| 5,933,498 | A | 8/1999 | Schneck et al. |
| 5,940,504 | A | 8/1999 | Griswold |
| 5,982,891 | A | 11/1999 | Ginter et al. |
| 5,987,134 | A | 11/1999 | Shin et al. |
| 5,999,624 | A | 12/1999 | Hopkins |
| 6,006,332 | A | 12/1999 | Rabne et al. |
| 6,020,882 | A | 2/2000 | Kinghorn et al. |
| 6,047,067 | A | 4/2000 | Rosen |
| 6,073,234 | A | 6/2000 | Kigo et al. |
| 6,091,777 | A | 7/2000 | Guetz et al. |
| 6,112,239 | A | 8/2000 | Kenner et al. |
| 6,135,646 | A | 10/2000 | Kahn et al. |
| 6,141,754 | A | 10/2000 | Choy |
| 6,157,719 | A | 12/2000 | Wasilewski et al. |
| 6,169,976 | B1 | 1/2001 | Colosso |
| 6,185,683 | B1 | 2/2001 | Ginter et al. |
| 6,189,037 | B1 | 2/2001 | Adams et al. |
| 6,189,146 | B1 | 2/2001 | Misra et al. |
| 6,209,092 | B1 | 3/2001 | Linnartz |
| 6,216,112 | B1 | 4/2001 | Fuller et al. |
| 6,219,652 | B1 | 4/2001 | Carter et al. |
| 6,236,971 | B1 | 5/2001 | Stefik et al. |
| 6,307,939 | B1 | 10/2001 | Vigarie |
| 6,353,888 | B1 | 3/2002 | Kakehi et al. |
| 6,397,333 | B1 | 5/2002 | Söhne et al. |
| 6,401,211 | B1 | 6/2002 | Brezak, Jr. et al. |
| 6,405,369 | B1 | 6/2002 | Tsuria |
| 6,424,717 | B1 | 7/2002 | Pinder et al. |
| 6,424,947 | B1 | 7/2002 | Tsuria et al. |
| 6,487,659 | B1 | 11/2002 | Kigo et al. |
| 6,516,052 | B2 | 2/2003 | Voudouris |
| 6,516,413 | B1 | 2/2003 | Aratani et al. |
| 6,523,745 | B1 | 2/2003 | Tamori |
| 6,796,555 | B1 | 9/2004 | Blahut |
| 6,918,113 | B2 * | 7/2005 | Patel et al. .................. 717/178 |
| 7,092,953 | B1 * | 8/2006 | Haynes ....................... 707/100 |
| 2001/0009026 | A1 | 7/2001 | Terao et al. |
| 2001/0011276 | A1 | 8/2001 | Durst, Jr. et al. |
| 2001/0014206 | A1 | 8/2001 | Artigalas et al. |
| 2001/0037467 | A1 | 11/2001 | O'Toole, Jr. et al. |
| 2001/0039659 | A1 | 11/2001 | Simmons et al. |
| 2002/0001387 | A1 | 1/2002 | Dillon |
| 2002/0035618 | A1 | 3/2002 | Mendez et al. |
| 2002/0044658 | A1 | 4/2002 | Wasilewski et al. |
| 2002/0056118 | A1 | 5/2002 | Hunter et al. |
| 2002/0069282 | A1 | 6/2002 | Reisman |
| 2002/0099948 | A1 | 7/2002 | Kocher et al. |
| 2002/0127423 | A1 | 9/2002 | Kayanakis |
| 2002/0128976 | A1 * | 9/2002 | O'Connor et al. ............. 705/59 |
| 2002/0191764 | A1 * | 12/2002 | Hori et al. ................... 379/200 |
| 2003/0097567 | A1 | 5/2003 | Terao et al. |
| 2003/0144869 | A1 * | 7/2003 | Fung et al. ..................... 705/1 |
| 2004/0039916 | A1 * | 2/2004 | Aldis et al. .................. 713/177 |
| 2004/0044779 | A1 * | 3/2004 | Lambert ..................... 709/229 |
| 2004/0052370 | A1 | 3/2004 | Katznelson |
| 2004/0098580 | A1 * | 5/2004 | DeTreville .................. 713/155 |
| 2004/0117784 | A1 * | 6/2004 | Endoh ........................ 717/169 |
| 2004/0172552 | A1 | 9/2004 | Boyles et al. |
| 2005/0060569 | A1 * | 3/2005 | Uesugi et al. ............... 713/200 |
| 2005/0060571 | A1 * | 3/2005 | Wang et al. ................. 713/200 |
| 2005/0071280 | A1 * | 3/2005 | Irwin et al. .................... 705/59 |
| 2005/0137984 | A1 | 6/2005 | Nguyen et al. |
| 2005/0187877 | A1 | 8/2005 | Tadayon et al. |
| 2005/0289072 | A1 * | 12/2005 | Sabharwal ..................... 705/59 |
| 2006/0155620 | A1 * | 7/2006 | Tsurubayashi et al. ......... 705/35 |
| 2007/0074270 | A1 * | 3/2007 | Meehan et al. ................. 726/2 |

FOREIGN PATENT DOCUMENTS

| | | |
|---|---|---|
| EP | 0 067 556 B1 | 12/1982 |
| EP | 0 257 585 A2 | 3/1988 |
| EP | 0 262 025 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0 731 404 A1 | 9/1996 |
| EP | 0 763 936 A2 | 3/1997 |
| EP | 0 818 748 A2 | 1/1998 |

| | | |
|---|---|---|
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 A | 3/1991 |
| JP | 5-100939 | 4/1993 |
| JP | 5168039 A2 | 7/1993 |
| JP | 6-131371 A | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |
| JP | 2005218143 A2 | 8/2005 |
| JP | 2005253109 A2 | 9/2005 |
| JP | 2006180562 A2 | 7/2006 |
| WO | WO 83/04461 A1 | 12/1983 |
| WO | WO 92/20022 A1 | 11/1992 |
| WO | WO 93/01550 A1 | 1/1993 |
| WO | WO 93/11480 A1 | 6/1993 |
| WO | WO 94/03003 A1 | 2/1994 |
| WO | WO 96/13814 A1 | 5/1996 |
| WO | WO 96/24092 A2 | 8/1996 |
| WO | WO 96/27155 A2 | 9/1996 |
| WO | WO 97/25800 A1 | 7/1997 |
| WO | WO 97/37492 A1 | 10/1997 |
| WO | WO 97/41661 A2 | 11/1997 |
| WO | WO 97/43761 A2 | 11/1997 |
| WO | WO 98/09209 A1 | 3/1998 |
| WO | WO 98/10561 A1 | 3/1998 |
| WO | WO 98/11690 A1 | 3/1998 |
| WO | WO 98/19431 A1 | 5/1998 |
| WO | WO 98/43426 A1 | 10/1998 |
| WO | WO 98/45768 A1 | 10/1998 |
| WO | WO 99/24928 A2 | 5/1999 |
| WO | WO 99/34553 A1 | 7/1999 |
| WO | WO 99/35782 A1 | 7/1999 |
| WO | WO 99/48296 A1 | 9/1999 |
| WO | WO 99/60461 A1 | 11/1999 |
| WO | WO 99/60750 A2 | 11/1999 |
| WO | WO 00/04727 A2 | 1/2000 |
| WO | WO 00/05898 A2 | 2/2000 |
| WO | WO 00/46994 A1 | 8/2000 |
| WO | WO 00/59152 A2 | 10/2000 |
| WO | WO 00/62260 A1 | 10/2000 |
| WO | WO 00/72118 A1 | 11/2000 |
| WO | WO 00/73922 A2 | 12/2000 |
| WO | WO 01/03044 A1 | 1/2001 |
| WO | WO 01/37209 A1 | 5/2001 |
| WO | WO 2004/034223 A2 | 4/2004 |
| WO | WO 2004/103843 | 12/2004 |

OTHER PUBLICATIONS

Blaze et al, "Atomic Proxy Cryptography" Draft (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

Elgamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6- 24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006).

Online Search Results for "inverted file", "inverted index" from www.techweb.com, www.cryer.co.uk, computing-dictionary.thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: the World of Knowbots (Draft), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

International Search Report mailed Aug. 9, 2007.

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

\* cited by examiner

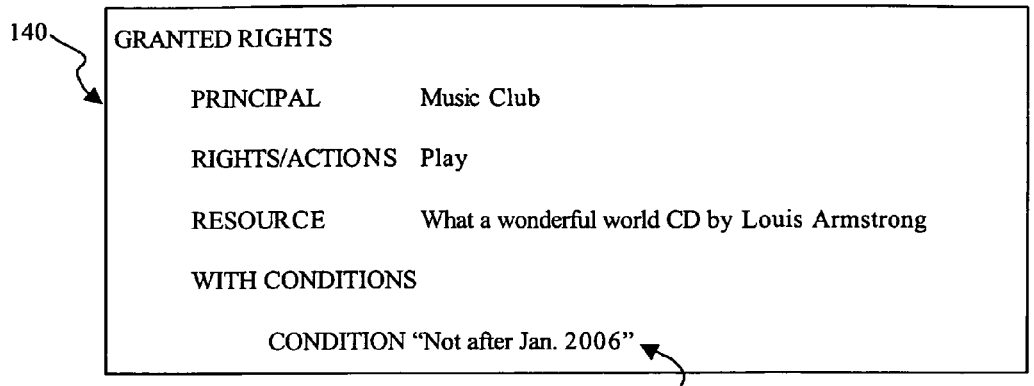
FIG. 4
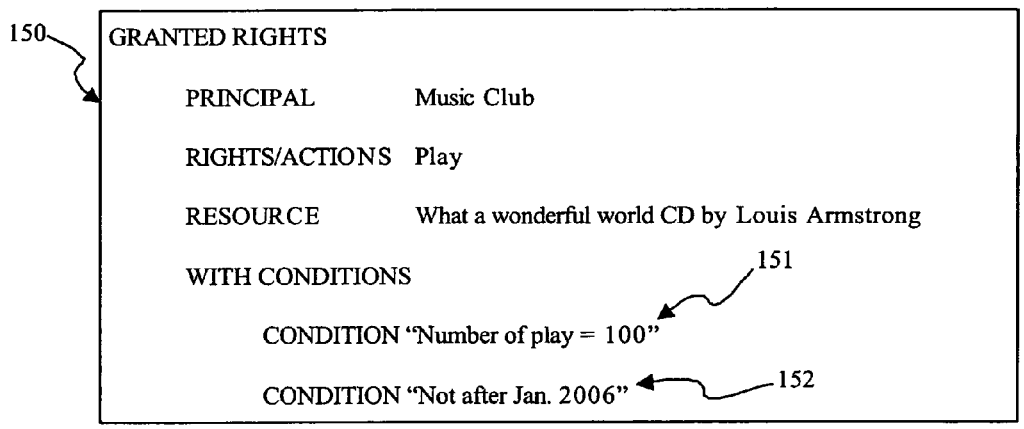
FIG. 5
125
```
<license xmlns="urn:mpeg:mpeg21:2003:01-REL-R-NS">
    <grant xmlns="urn:mpeg:mpeg21:2003:01-REL-R-NS">
        <principal>Alice</principal>
        <mx:play xmlns:mx="urn:mpeg:mpeg21:2003:01-REL-MX-NS"/>
        <resource>Gone with the wind DVD</resource>
    </grant>
</license>
```
FIG. 6

```
<license xmlns="urn:mpeg:mpeg21:2003:01-REL-R-NS">
     <grant xmlns="urn:mpeg:mpeg21:2003:01-REL-R-NS">
          <principal>Music Club</principal>
          <mx:play xmlns:mx="urn:mpeg:mpeg21:2003:01-REL-MX-NS"/>
          <resource>What a wonderful world CD by Loius Amrstrong</resource>
          <sx:exerciseLimit xmlns:sx="urn:mpeg:mpeg21:2003:01-REL-SX-NS">
               <sx:count>100</sx:count>
          </sx:exerciseLimit>
     </grant>
</license>
```

```
<license xmlns="urn:mpeg:mpeg21:2003:01-REL-R-NS">
     <grant xmlns="urn:mpeg:mpeg21:2003:01-REL-R-NS">
          <principal>Music Club</principal>
          <mx:play xmlns:mx="urn:mpeg:mpeg21:2003:01-REL-MX-NS"/>
          <resource>What a wonderful world CD by Louis Amrstrong</resource>
          <validityInterval>
               <notAfter>01-2006</notAfter>
          </validityInterval>
     </grant>
</license>
```

```
<license xmlns="urn:mpeg:mpeg21:2003:01-REL-R-NS">
     <grant xmlns="urn:mpeg:mpeg21:2003:01-REL-R-NS">
          <principal>Music Club</principal>
          <mx:play xmlns:mx="urn:mpeg:mpeg21:2003:01-REL-MX-NS"/>
          <resource>What a wonderful world CD by Louis Amrstrong</resource>
          <allconditions>
               <sx:exerciseLimit xmlns:sx="urn:mpeg:mpeg21:2003:01-REL-SX-NS">
                    <sx:count>100</sx:count>
               </sx:exerciseLimit>
               <validityInterval>
                    <notAfter>01-2006</notAfter>
               </validityInterval>
          </allconditions>
     </grant>
</license>
```

```
GRANTED RIGHTS
    PRINCIPAL          Alice
    RIGHTS/ACTIONS     Play
    RESOURCE           What a wonderful world CD by Louis Armstrong
    CONDITIONS
        CONDITION "Not After Jan 2006"  ◄──── 141
```
↗
142

FIG. 10

```
GRANTED RIGHTS
    PRINCIPAL          Alice
    RIGHTS/ACTIONS     Play
    RESOURCE           What a wonderful world CD by Louis Armstrong
    CONDITIONS
        CONDITION "Not After Jan. 2005"  ◄──── 144
```
↗
143

FIG. 11

METHOD AND SYSTEM TO SUPPORT DYNAMIC RIGHTS AND RESOURCES SHARING

FIELD OF THE INVENTION

This invention relates to the field of Digital Rights Management (DRM) and digital resource management, specifically the distribution and sharing of rights and resources.

BACKGROUND OF THE INVENTION

In current state-of-the-art DRM systems, the functionality of rights sharing among a set of potential users—which may be human beings or non-human entities, such as devices or services—is available in commercial products. A set of granted rights and how these rights may be shared are typically specified in the form of a license.

One form of license that is dedicated for rights sharing is called the concurrent user license (also known as site license or network license). A concurrent user license represents a pool of licenses that is tied to a network server; only users on this network can access the license and only a maximum number of users can access it concurrently.

In the conventional implementations of a concurrent user license, each user who is able to access the license is granted all the rights specified in the license—that is, all users have the same rights. A more advanced implementation of this type of license, by Macrovision FLEXnet, allows users of a concurrent user license to dynamically share a set of rights. Instead of specifying a set of rights that each user can have, the license specifies the maximum set of rights that all users can share. How these rights are shared is up to the purchaser of the license and can be configured using a custom access control mechanism consisting of an option file and software plug-in modules. The option file can be used to control among other things, the reservation of a number of licenses available in the license pool for a specific user or group of users, the reservation of some specific features that a user or group of users can access, and a stipulation of who can borrow a license from the pool for off-line usage. To illustrate some of the features supported by the option file, "RESERVE 1 install USER robert" reserves one license for the feature "install" for the user "robert"; "RESERVE 4 play GROUP accounting" reserves 4 licenses to play content for the accounting group; "INCLUDE_BORROW play USER tom" includes user "tom" in the list of users able to borrow feature "play". In addition to sharing, the option file includes an option to report usage. This is, in effect, a way for the license to impose the condition to track usage upon the user. During the authorization process to determine whether a user can access content, the license is processed by a generic license manager while the option file is processed by the plug-in to produce a combined response.

Even though Macrovision FLEXnet's approach gives the user the extra mechanism to control rights sharing according to their needs, it certainly has its limitations. For example, the license is tied to a network server, and only users on this network can access or borrow the license. Also, the option file is configured by a human being and is error-prone. For instance, while reserving licenses for the different groups within a department, the administrator can make a mistake so that the number of reserved licenses exceeds the pool capacity. This mistake can go unnoticed, and some group can end up sharing fewer licenses than expected. The option file, and therefore the sharing distribution, is a clear text file. It is protected only by the administrator password. The license server cannot perform the same rights management tasks it does with licenses, which are to verify the authenticity and integrity of the options. In addition, access control based on the option file on top of the license limits the portability of content, since content can only be accessed where the access control mechanism exists. When the content leaves the perimeter (the domain of the network server), the intended access control no longer applies.

The hard-coded option to report usage is only one of the possible conditions the license purchaser may want to impose upon the users of the license. The purchaser of the license should be able to add their own conditions to the distributed rights. The custom access control mechanism only supports one level of delegation. Only the administrator can distribute rights to the network users who cannot further distribute their rights. This delegation is not suitable in a hierarchical structure, which requires multi-level delegation. The sharing is focused on the access aspect or the control of certain actions. It is not a general-purpose resource sharing mechanism managed by rules or policies. The design is centered on controlling the actions of software programs. It is not intended to control other types of digital resources such as documents, audio and video files.

Another form of licenses that typically allows sharing within a personal domain is called an end-user license. This type of license requires that the license itself be bound to a specific environment, such as a device or user ID. Sharing is confined within a specific set of device types and/or a maximum number of devices, depending on the business models supported by the rights owner. Either all sharing devices have the same rights or each device has its own, separate set of rights.

In one example of the end-user license, Microsoft Windows Media Rights Management System may grant a content purchaser a set of rights comprising the rights to play content on his PC and to transfer content to other devices. The transfer right specifies the types of device eligible to receive the content and a few pre-determined rights for these devices. As the result of a transfer and according to the license on the PC, each target device has its own, separate set of rights.

In another example, Real Networks Helix DRM offers all network-connected devices (called Native Devices), such as a PC, set top box, home media server, or mobile phone, the ability to acquire their own contents and licenses. The Helix Device DRM supports transfer from a Native Device to a Secure Receiver Device, which is a device that requires a connection to a Native Device for the transfer of data and enforcement of business rules for that data. Examples of Secure Receiver Devices include personal music players, PDAs, and personal video players. Only the playback right is available on Secure Receiver Devices.

In still another example, the FLEXnet node-lock license can be bound to the specific device, requiring the license be consumed on that device only; or it can be bound to a specific user name, requiring devices have the same user name to consume the license. Of the two requirements, the former does not allow sharing, and the latter allows sharing among devices with the same user name, which is not very practical since devices preferably are distinguished by name.

In still another example, the FLEXnet mobile license is bound to a FLEXnet ID. The hardware (dongle) that contains the FLEXnet ID must be moved to the new device if the authorized user decides to consume the license on the new device.

Thus, the sharing schemes allowed by an end-user license do not permit the user to use the acquired rights as the maximum rights that he can use in any way he sees fit.

SUMMARY OF THE INVENTION

A need exists, then, for a system to support the dynamic rights sharing that allows users to share rights according to their needs. In this system, the acquired license represents a pool of rights, where each right can be further divided into sub-rights. A sub-right is the unit for rights distribution.

The invention relates to method for deriving a sub-right from a right, the right comprising a plurality of components, each of which specifies an aspect of the right. The method generally comprises the steps of receiving a sub-right, the sub-right comprising at least one of the components, each of which specifies an aspect of the sub-right, and confirming that the values of the components of the sub-right can be derived from the values of the corresponding components of the right. A component may be, for example, a principal, an action, a resource, and a condition.

The invention also relates to a method for integrating a first right with a second right. In this case, the methods comprises the steps of determining whether the first right can be derived from the second right by verifying that each of the first right components can be derived from its corresponding second right component, and combining the components of the first right with the corresponding components of the second right.

Furthermore, the invention relates to a method of sharing rights. The method comprises the steps of deriving a sub-right from a right, allowing use of the sub-right, and integrating the sub-right with the right. Then sub-right can be further derived for sharing. In addition, the rights may be specified in licenses and the method may further comprise installing the licenses on devices, and uninstalling the licenses, making them available for other installations.

In addition, the invention relates to a system to support rights sharing by enabling the derivation of a sub-right from a right, the right comprising plural components each of which specifies an aspect of the right, the system comprising a receiving module for receiving a sub-right, the sub-right comprising plural components each of which specifies an aspect of the sub-right, and a confirmation module for confirming that the values of the components of the sub-right can be derived from the values of the corresponding components of the right. The system may further comprise an installation module for installing a group license on a device, making it available for sharing, and for uninstalling an installed group license, making it unavailable for sharing on the current device, an installation tracking module to keep track of the installed/uninstalled group license, a tracking module to keep track of the states of rights of a group license, and a sharing module.

The invention further relates to a method for deriving a sub-right from a pool of rights granted by a grantor to a grantee for controlling use of resources within a computing environment, the computing environment having a mechanism for enforcing rights within the environment to control use of resources in accordance with the rights, the method comprising receiving, by a grantee, a pool of rights from a grantor, the pool of rights being associated with at least one resource, parsing, by the grantee, the pool of rights into one or more rights components, each of which specifies an aspect of the pool of rights, deriving a sub-rights component from at least one of the rights components, the sub-rights component being a sub-set of the corresponding rights component, and creating a license specifying sub-rights from the sub-rights components, the license being enforceable by the computing environment to control use of the resources in accordance with the sub-right and within the scope of the pool of rights. The method may further comprise the steps of granting the license to a sub-grantee, parsing, by the sub-grantee, the rights in the license as a sub-pool of rights into one or more second rights components, each of which specifies an aspect of the sub-pool of rights, deriving a second sub-rights component from at least one of the second rights components, the second sub-rights component being a sub-set of the corresponding second rights component, and creating a sub-license specifying sub-sub rights from the second sub-rights components, the sub-license being enforceable by the computing environment to control use of the resources in accordance with the sub-sub-right and within the scope of the sub-pool of rights.

To illustrate the disclosed concept of sub-right, consider the right to play an ebook 5 times. A sub-right of this right can be the right to play an ebook n times, where $0<n<5$. As long as sharing is within the pool capacity, this system permits the user to freely divide and distribute the acquired rights, whether rights are distributed to users on the same or different networks, or whether the distributed rights are consumed by the receivers or further distributed to other authorized entities. This system provides mechanisms to maintain the pool of rights, such as a method to divide rights into sub-rights and to integrate the remaining portion of a sub-right back into the pool for use by others.

BRIEF DESCRIPTION OF THE DRAWINGS

FIG. 4 illustrates a granted right with a time condition.

FIG. 5 illustrates a granted right with more than one condition.

FIG. 6 illustrates the MPEG-REL representation of the granted right illustrated in FIG. 2.

FIG. 7 illustrates the MPEG-REL representation of the granted right illustrated in FIG. 3.

FIG. 8 illustrates the MPEG-REL representation of the granted right illustrated in FIG. 4.

FIG. 9 illustrates the MPEG-REL representation of the granted right illustrated in FIG. 5.

FIG. 10 illustrates a right derived from the granted right illustrated in FIG. 4 based on the principal.

FIG. 11 illustrates a right derived from the granted right illustrated in FIG. 4 based on the principal and condition.

DETAILED DESCRIPTION OF THE INVENTION

Definitions

Figure 1:
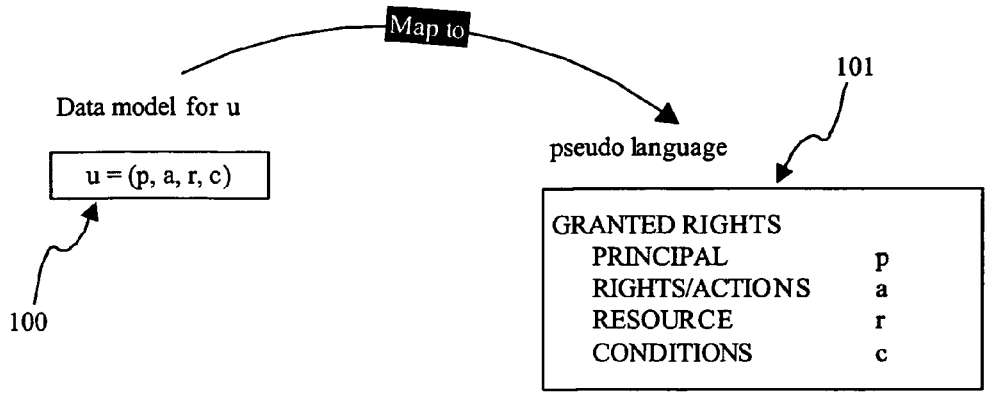
FIG. 1 illustrates the mapping between the data model for a granted rights and the pseudo expression language.

A right represents a statement that a rights grantee may perform an action or activity, typically on a resource, under a specified circumstance or a set of conditions.

A rights expression is the manifestation of rights in digital form. Examples of rights expressions include, but not limited to, XML-based rights expression languages such as ISO MPEG REL, XrML, SAML, XACML, ODRL, OMA REL; data structures; and bit-fields.

A license is a representation of rules captured using rights expressions. A license conveys the full context for the rights that are granted. The information captured in a license may include the grantor of the rights, the grantee of the rights, the resource, the permissions, and the associated terms and conditions.

A resource represents any content, service and even rights whose access, use, manipulation and/or distribution is managed and governed by a set of rules or policies.

Dynamic rights sharing as defined in this disclosure enables the ability to share at the rights grantee's discretion as opposed to the rights grantor's discretion. The rights grantor specifies the boundary of rights. Within those boundary conditions, the rights grantee can decide on the specific rights sharing mechanisms. A rights grantee may also be a grantor in a multiple tier rights granting chain.

Rights sharing involves dividing the granted rights into sub-rights. Then, the sub-rights are issued to a set of sub-grantees. Recursively, each grantee or sub-grantee can further share sub-rights with other sub-grantees down the granting chain. For example, a central library X purchases the rights to 30 copies of a book. The library X then decides that it will distributes 10 of its 30 copies to its sister library, Y. Thus, library X acts as a rights grantor to issue the sub-rights to 10 copies to library Y. Having received 10 copies from the library X, library Y further shares 3 of those copies with one of its local libraries, Z.

A first aspect of this invention is a method for deriving rights into sub-rights and integrating sub-rights back into the original right from which they were derived. Throughout this invention, a sub-right is also referred to as a derived right. The derivation and integration of rights serve as a basic mechanism for sharing rights among rights grantees. A rights grantee shares his rights by deriving new sub-rights for others. Then, each new sub-rights grantee is able to consume or further share the sub-rights with others.

A second aspect of this invention is a group license, which is used within a system for granting maximum rights to a set of one or more rights grantees and allowing these rights to be dynamically shared among them. The sharing mechanism of the group license is based on the capability of deriving sub-rights and issuing a shared license that contains the sub-rights. The shared license can be itself a group license that can be further shared. Thus, a group license supports dynamic and multi-tier rights sharing.

A third aspect of this invention is a system that implements the group license to support dynamic rights sharing and multi-tier rights sharing among groups of rights grantees and across groups of rights grantees. The disclosed system can be implemented in any DRM system that is capable of authorizing the consumption of rights and tracking the usage and states of rights.

This invention first discloses a method to derive sub-rights from a given right. This method ensures that the sub-rights are within the boundaries of the original rights from which the sub-rights are derived. This method can be used for rights divisions in a dynamic rights sharing system. This method may include verifying that a component of the sub-right is the corresponding component of the right. For example, this method may include verifying that a component of the sub-right is part of the corresponding component of the right in case the latter represents a collection. This method may also include verifying a component of the sub-right is an instance of the corresponding component of the right in case the latter represents a class, where the class may represent a universe of the component.

Each sub-right grants the next rights grantee (or grantees) parts or the whole rights from which the sub-right was derived. Then, consumption of each sub-right is authorized independently from the right from which the sub-right was derived and from other sub-rights. Thus, the capability of deriving sub-rights is a basic mechanism for dynamic rights sharing.

This invention also presents a new concept called group license. A group license is a license that grants maximum rights to one or more grantees, allowing the grantees to share the granted rights according to the grantees' sharing policies if such sharing is permitted by the group license. The sharing members may be extended beyond the grantees to include other authorized users if such sharing is permitted by the group license.

The semantics of a group license employs the disclosed method to derive sub-rights specification. A group license system may derive sub-rights as part of its rights issuance authorization process. The group license system authorizes the issuance of a license to contain the sub-rights only if the sub-rights are within the limits of the license at the time of issuance. The issued license can be used to by grantees or further divided to include group licenses. In addition, the semantics of a group license supports the integration of the unused portion of a sub-right back into the right from which the sub-right was derived.

This invention also presents an exemplary system that processes group licenses for dynamic sharing among rights grantees. This system also has the capability to re-integrate unused shared rights back into group licenses. The disclosed system contains a set of basic components that can be designed into different configurations and integrated into a DRM system that supports rights authorization and tracking. In addition to the preferred exemplary system, other implementations can be designed incorporating the disclosed concepts.

Method for Deriving Rights for Sharing

Current rights sharing mechanisms are either specifically implemented for particular applications, require a central authorization to control the sharing, or require the sharing to occur within a specific environment. Such sharing schemes limit the ability of the rights grantees to share their rights. This invention discloses a new rights sharing method based on the derivation of rights. The disclosed methods enable rights to be dynamically shared among rights grantees and the shared rights can be further shared with other rights grantees. The disclosed methods are general; they can be applied to any system that requires rights and resource sharing.

This invention first introduces a general data model for a right that can be mapped to the existing implementation of rights. Then, this invention discloses a method for deriving sub-rights from granted rights and integrating sub-rights back into the original granted rights. Along with the method for deriving rights, this invention also describes how the disclosed method can be applied to current sharing schemes to address some of their limitations.

Data Model for a Right

A general data model for a right u may be represented as follows:

$$u=(p,a,r,c)$$

where:

p is a principal, set of principals, or anonymous principal to whom the action a is granted. Thus, p represents a rights grantee or grantees;

a is an action or activity that p is allowed to perform;

r is a resource associated with action a, and $c=\{c_i|i=0\ldots n\}$ is a set of conditions that make up the specified circumstance under which p may perform a on r. $c_i$ is called the terms and conditions associated with u.

Each of p, a, r and $c_i$ specified in u is called a component of the granted right u. For illustration purposes, this general data model can be mapped onto the following pseudo expression language:

| GRANTED RIGHTS |
| --- |
| PRINCIPAL p |
| ACTION a |
| RESOURCE r |
| CONDITIONS c |

FIG. 1 illustrates the mapping between the data model for a right u (100) and the above pseudo expression language 101 where the granted right u is mapped to the expression "GRANTED RIGHTS", principal p is mapped to the expression "PRINCIPAL p", action a is mapped to the expression "RIGHTS a", resource r is mapped to the expression "RESOURCE r," and conditions c is mapped to the expression "CONDITIONS c."

This data model for rights is also suited for general purpose resource sharing. When a is defined as a generic action such as "use" or "own," the data model as well as the system and methods disclosed in this invention can be used to achieve broad resource sharing governed by the conditions specified in c. In this case, the action a specified in right u is open to any use. Consequently, the sharing system and methods disclosed in the rest of this invention can be viewed as a resource sharing system and methods. For example, the owner of computing resources intends to share the CPU cycles to facilitate parallel processing on academic research projects. The owner does not want to know the specific types of programs that will be executed by trusted colleagues using the idle CPU cycles. Under this usage scenario, the owner issues a right u that defines principal p as any member within the trusted research community, action a as any use, resource r as the CPU cycles, and conditions c as anytime between 10 pm to 6 am. With this granted right, members of the trusted research community are permitted share the CPU cycles between 10 pm to 6 am. In this instance, the primary target of sharing is the resource r instead of the action a.

Figure 2:
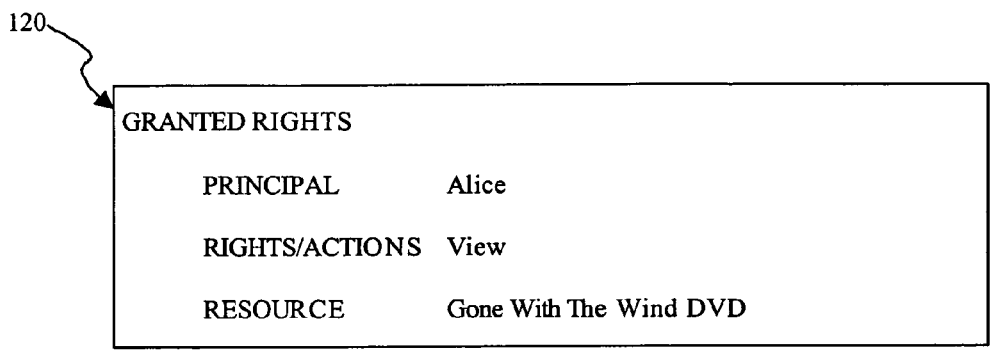
FIG. 2 illustrates an unconditional right in the pseudo expression language.
Figure 3:
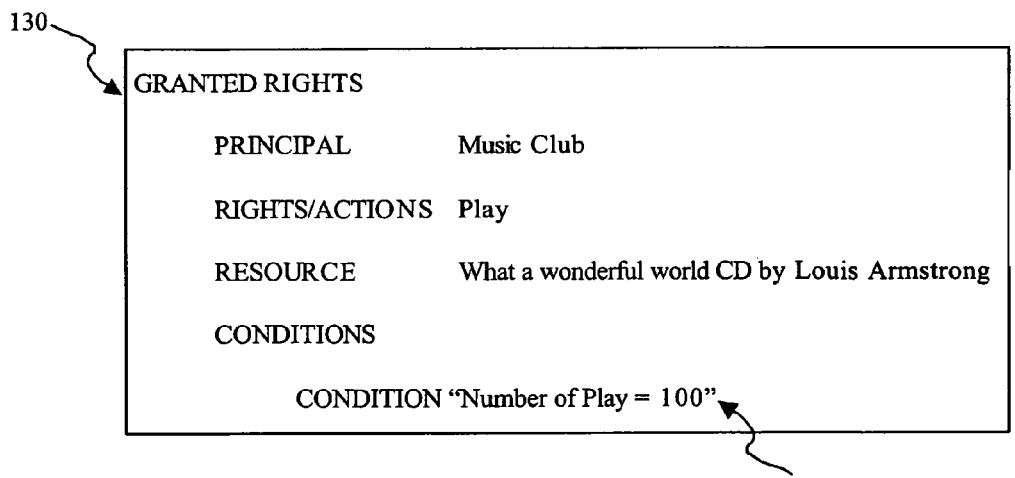
FIG. 3 illustrates a granted right with a condition on the number of plays.

The following figures described herein provide examples of granted rights expressed in the pseudo expression language described above. FIG. 2 illustrates a granted right 120 with no condition in which the principal identified as Alice is granted the right to view the DVD whose title is "Gone With The Wind." FIG. 3 illustrates a granted right 130 with one condition. The principal identified as Music Club is granted the right to play the CD "What a wonderful world" by Louis Armstrong. The granted right has a condition 131 limiting playing of the CD to 100 times. FIG. 4 illustrates a granted right 140 with one condition. The principal identified as Music Club is granted the right to play the CD "What a wonderful world" by Louis Armstrong. The granted right has a condition 141 limiting the time during which the CD may be played to not after January 2006. FIG. 5 illustrates a granted right 150 with two conditions. The principal identified as Music Club is granted the right to play the CD "What a wonderful world" by Louis Armstrong. The granted right has a condition 151 limiting playing of the CD to 100 times and a condition 152 limiting the time during which the CD may be played to not after January 2006.

Even though the above pseudo expression language is used throughout this invention for illustration purposes, this invention is not restricted to any particular rights expression languages, data structures, representations, and the like.

The data model for a right is versatile and capable of modeling any form of rights expression. For example, FIG. 6, FIG. 7, FIG. 8, and FIG. 9 use the MPEG REL (125, 135, 145, and 155) to express the same granted rights as FIG. 2, FIG. 3, FIG. 4, and FIG. 5, respectively.

In another example, the above data model for rights can be used to model the structure of Copy Control Information bits (CCI-bits), which are two bits representing the protection status of the protected content such as copy never, copy freely, copy one generation, as follows:

$$u=(p=null,a=CCI,r=null,c)$$

where p implies the content receiving device, a is an act of copy, r implies the content with which the CCI-bits are associated, and condition c is a restriction on the copy act. Such restrictions include copy never, copy freely or copy one generation.

In a third example, the following FLEXnet license that grants all devices that can access the license server machine "lulu" two licenses for feature "f1", six licenses to feature "f2" and one license to feature "f3"

```
"SERVER lulu 17007ea8
VENDOR sampled
FEATURE f1 sampled 1. 00 1-jan-2005 2 SIGN=signature1
FEATURE f2 sampled 1. 00 1-jan-2005 6 SIGN=signature2
FEATURE f3 sampled 1. 00 1-jan-2005 1 SIGN=signature3"
```

Using the above data model for rights, the above FLEXnet license can be mapped to three separate rights as follows. The principal p is the host ID of the authorization server in a FLEXnet float license or the host ID of a node to which the FLEXnet feature is bound. In the above FLEXnet example, the principal p is all devices that can access the license server "lulu." The action a is the right to execute the features specified in the FEATURE lines of the FLEXnet license. The resource r is a feature specified in the FLEXnet license. In the above example, the resource r is FLEXnet's FEATURE f1, f2, and f3. The condition c is the limitations specified in the FEATURE lines of the FLEXnet license. In the above example, the condition on FEATURE f1 is two licenses, the condition on FEATURE f2 is six licenses, and the condition on FEATURE f3 is three licenses.

Based on the data model for a right, a right may be unconditional, which means it has no associated conditions such as a granted right illustrated in FIG. 2. On the other hand, a right may be conditional, which means it is associated with one or more conditions such as the examples of granted rights illustrated in FIG. 3 and FIG. 4.

Conditions c specified in a granted right u=(p, a, r, c) are generally conditions that must be met or obligations that must be performed in order for the principal p to perform the action a on the resource r. There are two types of conditions that can be associated with rights, stateless conditions and state conditions.

Stateless conditions are conditions that are not associated with states. These conditions are obligations that must be performed in order to exercise the granted right. They are not directly related to the lifetime of the granted right. Stateless conditions typically relate to business rules (such as a method of payment, a percentage of a payment that must be made to each involved party, and so on), authorization rules (such as seeking approval to exercise rights), system requirements, and the like.

State conditions are conditions that are associated with one or more states. These conditions are directly related to certain activities during the lifetime of the granted right, such as the number of times a granted right can be exercised, a time window during which a granted right may be exercised, and so on. State conditions can be further divided into two types, depending on the characteristics of their states.

Reference conditions are state conditions that read states without modifying them. With this type of condition, the transition of the state from the current value to the next value is independent of exercising or consuming the granted right. For example, FIG. 4 illustrates a condition that stipulates the time window during which the granted right may be exercised. In this example, the current value of the state continues to change as time passes whether or not the granted right is exercised.

Divisible conditions are state conditions that read and update states. With this type of condition, the transition of the state from the current value to the next value is triggered each time the granted right is exercised. For example, FIG. 3 illustrates a condition that stipulates the number of times the granted right may be exercised. In this example, the current value of the state decreases by one each time the granted rights is exercised.

To incorporate the dependency of conditions on states, the data model for a granted right u=(p, a, r, c) as disclosed above can be expanded as follows:

$$u=(p,a,r,c_i \Rightarrow Q_i: i=1,\ldots,n)$$

where $(c_i \Rightarrow Q_i: i=1, \ldots, n)$ implies that $Q_i$ is the states associated with the condition $c_i$ for $i=1 \ldots n$. If a condition $c_i$ is a stateless condition, then $Q_i$ is null. The state of a right is represented by the states of all conditions associated with that right.

Derivation and Integration of Rights

The principal p specified in a granted right u=(p, a, r, $c_i \Rightarrow Q_i: i=1, \ldots, n$) may represent a group of principals instead of a single principal. For example, FIG. 4 illustrates a right granted to Music Club to play the "What a wonderful world" CD by Louis Armstrong with a condition restricting exercise to not after January 2006. "Music Club" refers to a group of people, and any person who is a Music Club member may play the CD as long as the current time is not after January 2006.

If a principal identified as Alice is a Music Club member, Alice can exercise the right specified in FIG. 4 to play the "What a wonderful world" CD. However, as illustrated in FIG. 10, Alice is also granted the right 142 to play the "What a wonderful world" CD with the same condition 141 as the granted right specified in FIG. 4. To the principal Alice, both of the granted rights specified in FIG. 4 and FIG. 10 are exactly the same. Thus, as the granted right in FIG. 10 is a specific instance of the granted right in FIG. 4, the granted right in FIG. 10 can be considered a right derived from the granted right in FIG. 4. Similarly, FIG. 11 illustrates a right 143 that is derived from the granted right in FIG. 4. In this instance, the condition 144 is altered, while still remaining within the scope of condition 141 of the granted right in FIG. 4.

Similar to the principal p, each p, a, r or $c_i$ in u=(p, a, r, $c_i \Rightarrow Q_i: i=1, \ldots, n$) can refer independently to a group of principals, actions, resources, or conditions, respectively. Thus, there are cases when different rights are exactly the same within a given context. In this case, those rights are related, and one may be derived from the other.

Derivation Rules

Let $u=(p,a,r,c_i \Rightarrow Q_i: i=1, \ldots, n)$ and $v=(p',a',r',c'_i \Rightarrow Q'_i: i=1, \ldots, m)$ be two rights. v is said to be derived from u if $m \leq n$ and the following rules apply:

Rule D1: $p \Rightarrow p'$, $a \Rightarrow a'$, $r \Rightarrow r'$

Rule D2: $\forall i \leq m$, $c_i \Rightarrow c'_i$

Rule D2.1: if $Q_i$ is an unordered set representing the possible state values of $c_i$, then $Q'_i = Q_{i,0} - Q_i$, where $Q_{i,0}$ is the state of u prior to deriving v.

Rule D2.2: if $Q_i$ contains only one value representing the cumulative value of $c_i$, then $\|Q'_i\| \leq \|Q_{i,0}\|$, $\|Q_i\| \leq \|Q_{i,0}\|$ and $\|Q_i\| + \|Q'_i\| \leq \|Q_{i,0}\|$ where $Q_{i,0}$ represents the state of $c_i$ prior to deriving v, and the notation $\|Q_i\|$ denotes the norm (i.e. the value) of $Q_i$.

Rule D2.3: if $Q_i$ is an ordered set representing the possible range values of $c_i$, then $Q'_i \subset Q_{i,0}$ and $Q'_i \cap Q_i = \emptyset$ where $Q_{i,0}$ represents the state of u prior to deriving v.

The notation $p \Rightarrow p'$ means that p implies p' or p derives p' or p' is derived from p. For example, Alice is also known as "Key Holder A," so Alice implies "Key Holder A." The rules to determine if $p \Rightarrow p'$ are application dependent. However there are special cases that if p' is the same as p, or p' is an instance of p, or p is null then $p \Rightarrow p'$.

Rule D1 defines that a sub-right must specify only those principals, actions, and resources permitted by the right from which it is derived. More specifically, Rule D1 requires the following of a sub-right. The principal p' must be derived from p. For instance, if p is "any employee from department X," then p'="Alice" is said to be derived from p if Alice is indeed an employee from department X. The action a' must be derived from a. For instance, if a is "the action of modifying (including the action of annotating) and the action of making changes", then a'="the action of annotating" is said to be derived from a. The resource r' must be derived from r. For instance, if r is "any book from Publisher Y," then r'="Learning XML" is said to be derived from r if "Learning XML" is published by Publisher Y.

Rule D2 states that each condition $c'_i$ must be derived from its corresponding $c_i$. The derivation of the states of a condition is dependent on the type of the condition, its possible state values, and its current state value. Rules D2.1-D2.3 define this dependency, as illustrated below.

To illustrate Rule D2.1, let c be a condition that limits printing to a number of distinct chapters, say chapters 1, 3 and 5, then Q={chapter 1, chapter 3, chapter 5}. For the first sub-right derivation, the valid Q' sets are: {chapter 1}, {chapter 3}, {chapter 5}, {chapter 1, chapter 3}, {chapter 1, chapter 5}, {chapter 3, chapter 5} and {chapter 1, chapter 3, chapter 5}. After {chapter 1} is granted to the first sub-right, Q becomes {chapter 3, chapter 5} and Q' can only be one of {chapter 3}, {chapter 5} and {chapter 3, chapter 5}.

To illustrate Rule D2.2, let c be a condition that limits playback to three times, then Q={3}. For the first sub-right derivation, the valid Q' sets are: {1}, {2}, and {3}. For examples, if {2} is granted to the first sub-right, the current state of c is 1, and Q' can only be {1}.

To illustrate Rule D2.3, let c be a condition that limits playback to a validity period between 11/1/2004 and 11/5/2004. Let Q be an ordered set of all possible sub-intervals of 11/1/2204-11/3/2004, such as {{11/1/2004-11/2/2004}, {11/1/2004-11/3/2004}, {11/21/2004-11/3/2004}}. After the interval {11/2/2004-11/3/2004} is granted to the first sub-right, then Q becomes {{11/1/2004-11/2/2004}, {11/3/2004-11/5/2004}}.

Thus, the derivation rules defined above state that if p implies p', a implies a', r implies r', $c_i$ implies $c'_i$; and $Q'_i \subset Q_i$ $\forall i \leq m \leq n$, then the granted right $v=(p',a',r',c'_i \Rightarrow Q'_i: i=1, \ldots, m)$ can be derived from $u=(p,a,r,c_i \Rightarrow Q_i: i=1, \ldots, n)$.

Note that v can contain conditions that were not derived from u. Those conditions are called restricted conditions in this invention. Restricted conditions allow the grantor of the sub-right to further restrict the rights grantee in consuming the sub-right. If a sub-right v contains any restricted conditions, it is sometimes called a conditional sub-right. For example, the company X grants its department Y ten copies of the DVD Z if the department Y achieves at least 80 percent of the department's objective. When integrating v back into u, all restricted conditions are ignored.

The implications between p and p', between a and a', between r and r', and between $c_i$ and $c'_i$ are application dependent. Those implications can be defined within the application or expressed in the rights expressions. When the implication is defined within the application, the application determines whether one expression is implied by the other. If the implication is expressed within the rights expression, the application can verify whether one expression implies another expression by evaluating those expressions against the rights expression.

When $v=(p', a', r', c'_i \Rightarrow Q'_i: i=1, \ldots, m)$ is derived from $u=(p,a,r,c_i \Rightarrow Q_i: i=1, \ldots, n)$, then v is said to be a derivation of u or sub-right of u. In other words, u is said to be an integration of v. For example, the granted rights illustrated in FIG. 10 and FIG. 11 are sub-rights of the granted right specified in FIG. 4. If v is derived from u, then v is called a derivation or a sub-right of u.

Figure 12:
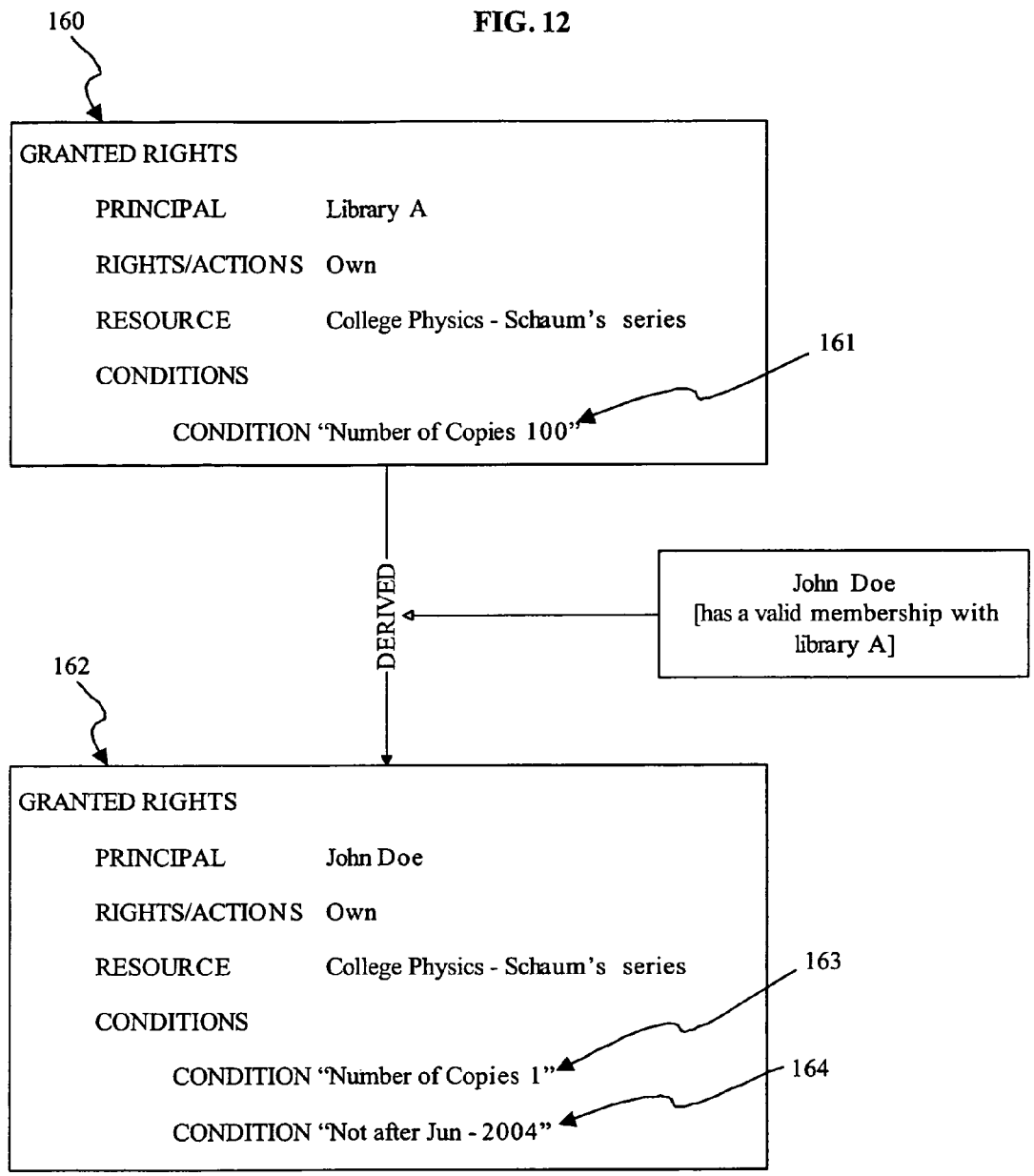
FIG. 12 illustrates the process of deriving a right from a granted right based on a specified principal.

FIG. 12 illustrates the derivation of a granted right 160. Granted right 160 is granted to principal Library A, and has a single condition 161 related to the number of copies. If Principal John Doe is a member of Library A, granted right 162 may be derived from granted right 160. In this instance, granted right 161 includes two conditions. Condition 163 gives John Doe a single copy of the resources. Condition 164 assigns a time restraint on John Doe's use of the resource.

Figure 13:
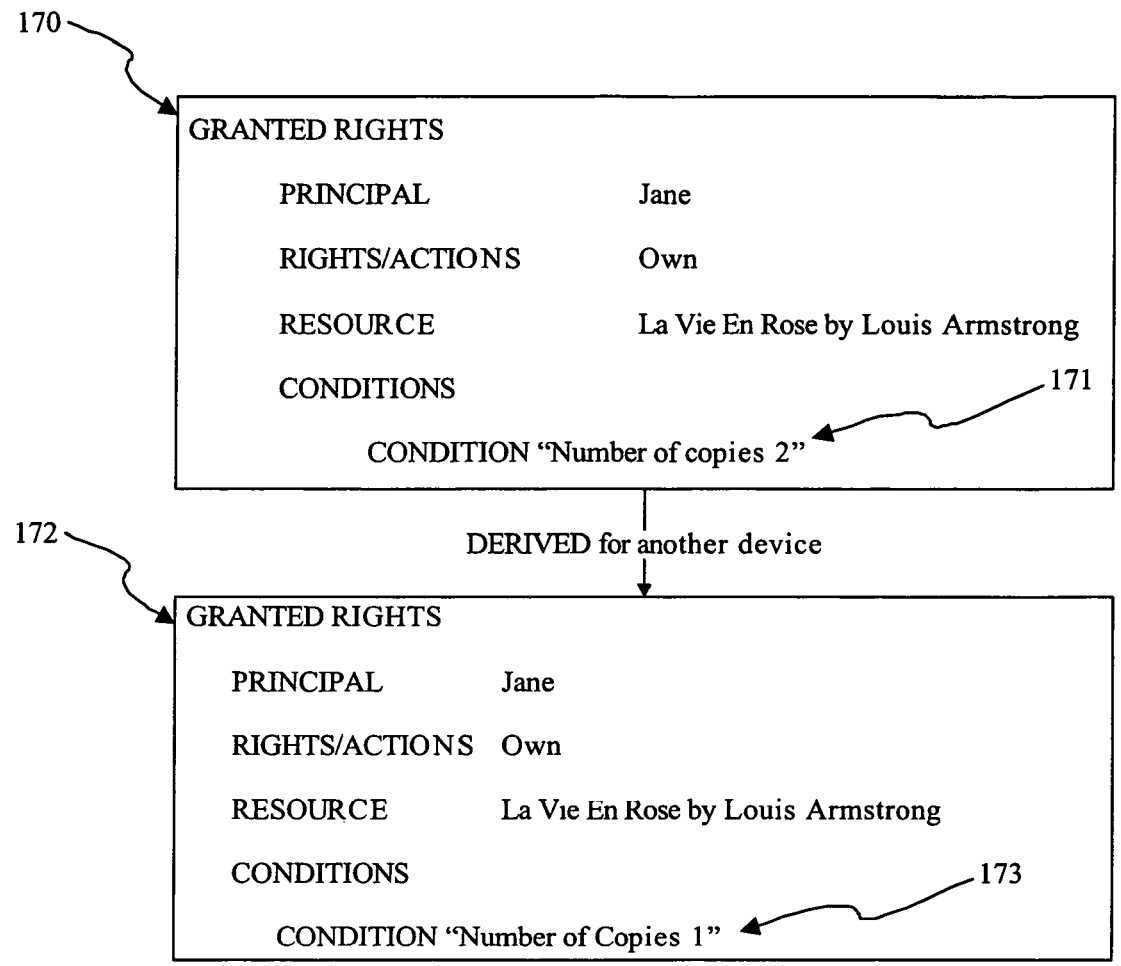
FIG. 13 illustrates the process of deriving a right from a granted right based on a condition.

Similarly, FIG. 13 shows the derivation of a granted right 170 for use on another device. Granted right 170 has one condition 171 that states that Principal Jane may use two copies of the resource. Derived right 172 includes a condition 173 that restricts Jane's use to a single copy of the resource.

Integration Rules

The method of integrating rights is the reverse of the method of deriving rights.

Given a right u and a sub-right v, the rules for integrating v back into u are defined as follow:

Definition: Let $u=(p, a, r, c_{i,1} \Rightarrow Q_i: i=1, \ldots, n)$ be a right and let $v=(p',a',r',c'_{i,2} \Rightarrow Q'_i: i=1, \ldots, m)$ be a sub-right of u. A right $u'=(p,a,r,c_i \Rightarrow Q^*_i: i=1, \ldots, n)$ is defined to be the integration of right u and its sub-right v if $m \leq n$ and the following rules apply:

Rule I1: $p \Rightarrow p'$, $a \Rightarrow a'$, $r \Rightarrow r'$

Rule I2: $\forall i \leq m$, $c_i \Rightarrow c'_i$

Rule I2.1: if $Q_i$ is an unordered set representing the possible state values of $c_i$, then $Q'_i$ must also be an unordered set representing the possible state values of $c'_i$ and $Q^*_i = Q_i \cup Q'_i$.

Rule I2.2: if $Q_i$ contains only one value representing the cumulative value of $c_i$, then $\|Q^*_i\| = \|Q_i\| + \|Q'_i\|$ where $\|Q_i\|$ denotes the norm (i.e. the value) of $Q_i$.

Rule I2.3: if $Q_i$ is an ordered set representing the possible range values of $c_i$, then $Q'_i$ must also be an ordered set representing the possible range values of $c'_i$, and $Q^*_i = Q_i \oplus Q'_i$. $\oplus$ denotes a customized union operation, which is system dependent. For instance, a system can define the granularity of the range, and how ranges can be merged (including how to handle gaps while merging ranges).

Rule I1 defines that a sub-right must contain only those principals, actions, and resources permitted by the right from which it is derived. Rule I2 states that each condition $c'_i$ must be derived from its corresponding $c_i$. The derivation of the states of a condition is dependent on the type of the condition, its possible state values, and its current state value. Rules I2.1-I2.3 define this dependency. In particular, Rule I2.1 says that if Q and Q' are both unordered sets of distinct values, then the integrated Q* is the union of Q and Q'. Rule I2.2 says that if Q and Q' each has one element representing a cumulative value, then the integrated cumulative value is the sum of these two values. Rule I2.3 says that if Q and Q' are ordered sets representing intervals, then the integrated Q* is the union of both sets.

Divisible Rights, Concurrent Rights, Shareable Rights, and Group Licenses

The derivation rule defined above is a general mechanism to derive a sub-right from a given right or to determine if a given right can be derived from another right. The rule specifies that sub-rights can be derived using either or both of the following mechanisms: deriving sub-rights using any component of a granted right, or dividing any state condition to create sub-rights from a granted right.

However, different applications may allow only certain components of a granted right to be used to derive sub-rights or allow only certain state conditions to be divided to create sub-rights. For example, a library application may allow derivation of sub-rights using the principal specified in the granted right, so that the library can derive sub-rights for its members from a right that was granted to the library. FIG. 12 illustrates library A deriving a sub-right from its granted right for its member, John Doe. In FIG. 12, the sub-right is derived based the principal.

In another example, a home network application may allow certain condition states to be divided. In this case, the home network's user can derive rights for each device within the user's home network from a right that was granted to the user. FIG. 13 illustrates a scenario in which the user Jane derives a right for use on another device from Jane's granted right. In this example, the derivation of the sub-right is based on the divisibility of the condition states associated with the granted right.

Granted rights can be classified into the following types based on the ability to derive sub-rights: divisible rights, concurrent rights, sharable rights, and group licenses. Each of these types of rights is described below.

Divisible Rights

A divisible right is a right with one or more state conditions that can be divided to create sub-rights while other components of the divisible right remain unchanged. There are many uses of divisible rights. They can, for example, be used to simulate the fair use rights of consumers. Having acquired a right, the consumer may divide it into sub-rights for use on different devices, in different places, at different times, and so on.

When sub-rights are derived from a divisible right, the current state of each divisible condition in the original divisible right is updated according to the initial states for the corresponding condition in each of the derived sub-rights and the state function of that condition. For example, suppose a divisible right has a condition restricting the number of times that the user can exercise the right and the current condition state indicates that five exercises remain. When deriving a sub-right with two as the maximum number of exercises, the current state of that condition for the divisible right from which the derivation took place is updated to reflect three remaining exercises (two exercises are deducted from five).

The reference conditions of the derived sub-rights may be restricted with respect to the same reference conditions of the original divisible right. For example, if the divisible right has a condition that specifies a time range within which the right may be exercised, a derived sub-right must also have a reference condition stipulating a time range in which the right may be exercised, and the sub-right's time range must fall entirely within the time range specified for the divisible right.

Thus, a right $u=(p,a,r,c_i \Rightarrow Q_i: i=1, \ldots, n)$ is a divisible right if there is at least one i such that ci is a divisible condition. Furthermore, $v=(p,a,r,c_i' \Rightarrow Q'_i: i=1, \ldots, m)$ is a derivation or sub-right of u if:

There is at least one i such that $c_i$ is a divisible condition;

v contains all conditions that are specified in u, such that $c_i'=c_i$, $i=1 \ldots n$ and $Q'_i \subset Q_i$, $\forall i \leq m \leq n$;

the current state of each divisible condition $c_i$ of u after the derivation v is updated according to the current state of $c_i$ before the derivation v, the initial states of the derivation v, and the state function of $c_i$;

for all reference condition $c_i$, $c_i'$ is either $c_i$ or restriction of $c_i$. For example, if a condition $c_i$ is not before time t1 and not after time t2, then the derived condition $c_i'$ may be not before t3 and not after t4, where $t1 \leq t3 \leq t4 \leq t2$ and the notation $\leq$ is less than or equal; and for all stateless condition $c_i$, $c_i'$ is $c_i$.

Figure 14:
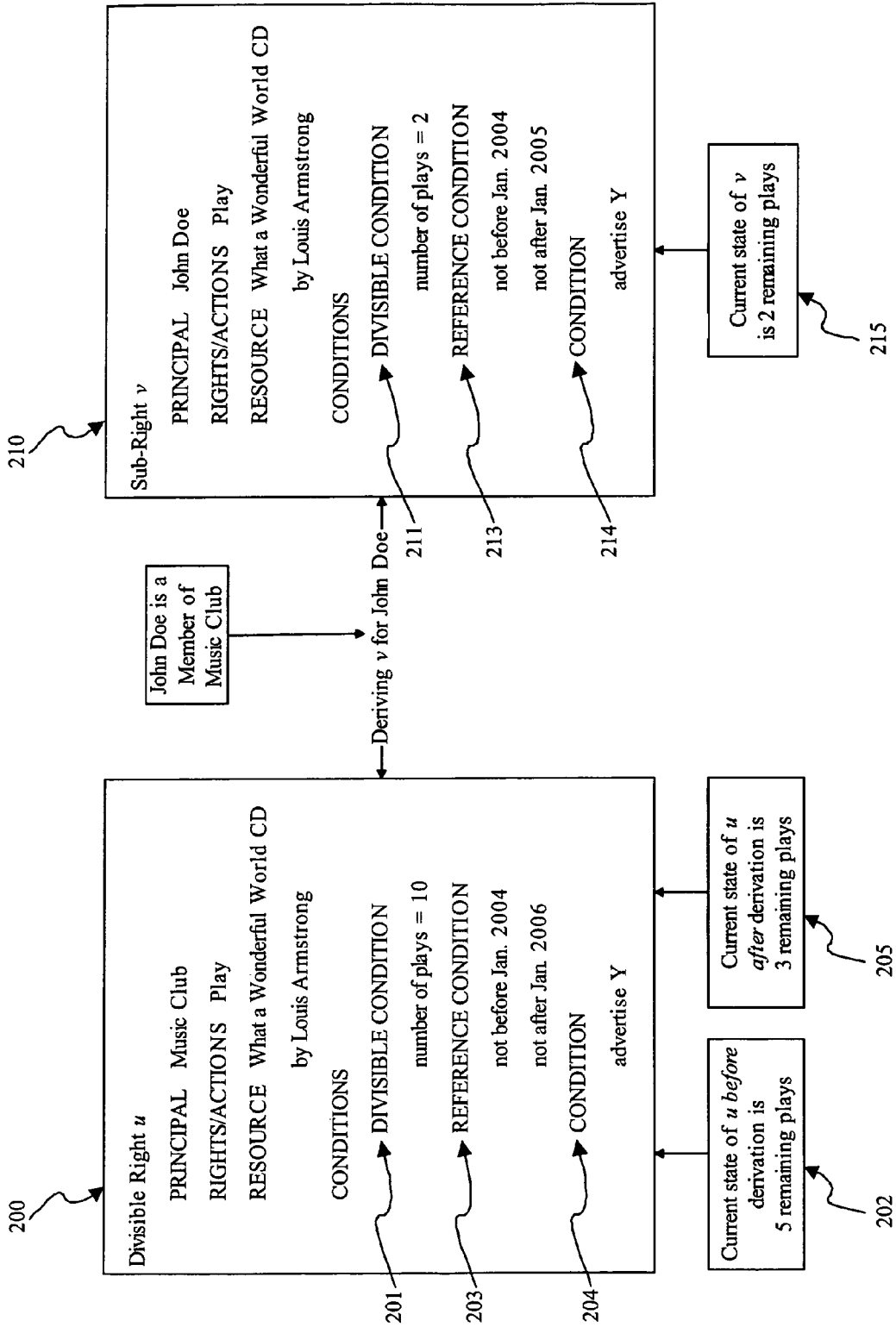
FIG. 14 illustrates a scenario in which a new right is derived from a divisible right.

FIG. 14 illustrates the process of deriving sub-right v (210) from a divisible right u (200). In this example, the divisible right u has three conditions:

a divisible condition 201 that stipulates ten as the allowable number of exercise with a current state 202 of five exercises remaining;

a reference condition 203 that stipulates a time range (not before January 2004 and not after January 2006) during which the right may be exercised; and a stateless condition 204 that stipulates that an advertisement, Y, must be run while exercising the granted right.

The sub-right v (210) is derived from u with the same set of conditions. In particular:

For the divisible condition 211, v has a condition stipulating two as the allowable of number of exercises. The current state for the same condition in u is updated from five remaining exercises to three remaining exercises.

For the reference condition 213, v has a condition stipulating the time range during which the right may be exercised. This condition is derived from u, so the time range condition stipulated in v falls entirely within the time range stipulated in u.

For the stateless condition 214, v has exactly the same condition as u.

After the derivation, the current state 205 of divisible right u (300) is three remaining plays. Correspondingly, updating the rights expression of the right u may be required.

In this example, the format of the pseudo language has been changed to reflect the characteristics of the granted rights and conditions. Thus, "GRANTED RIGHTS" has been changed to "DIVISIBLE RIGHTS," indicating that the granted right is actually divisible. The "CONDITION" has been changed to either "DIVISIBLE CONDITION," "REFERENCE CONDITION," or just "CONDITION" to reflect condition types. The declaration of the DIVISIBLE CONDITION includes the condition's current state.

This change in the format does not suggest a specific implementation. The methods used to identify the type of granted rights and conditions are left to the implementation. For example, the type can be identified by name, explicitly declared in the expressions (as in FIG. 14), or identified using any other mechanism. However, explicit declaration of condition types does have an advantage. The same condition (for example, the maximum number of allowable exercises) can be divisible in one granted right but not divisible in others. The current state of a divisible condition is declared either within the condition (as in FIG. 14) or retrieved from a known authorization source (such as an authorized tracking device, remote service, central service, and the like).

Concurrent Rights

A concurrent right is a right from which sub-rights can be derived based on the principal while other components of the concurrent right remained unchanged. In a concurrent right, the principal refers to a group of principals, to the same principal with multiple identifications, or both. Each principal in the group inherits the same rights specified in the concurrent right. Concurrent rights allow the derivation of the principal specified in the granted right so that a sub-right can be derived for a specific principal.

A concurrent right may contain state conditions, but those conditions are not divisible. When sub-rights are derived from the concurrent right with state conditions, the state conditions are reproduced exactly (with the same state values) in the sub-rights. Then, the condition states in the sub-rights are individually managed for each derived principal. Thus, each derived principal independently maintains the state to track the consumption of the granted rights.

An example concurrent right is a membership that conveys the same set of rights to each member of a group. In some applications, derivation of a sub-right from a concurrent right is necessary when a rights consumption device cannot prove that a specific principal actually belongs to the group specified by the principal in the concurrent right.

A right $u=(p,a,r,c_i \Rightarrow Q_i: i=0, \ldots, n)$ is a concurrent right if:
$c_i$ is not a divisible condition, for all i; and
there is at least one p' such that $p \Rightarrow p'$ and a right $v(p',a,r, c_i \Rightarrow Q_i: i=0, \ldots, n)$ is a derivation of u. For example, if p is Music Club and p' is Alice, a member of the Music Club, then $p \Rightarrow p'$. In another example, p is Alice, and Alice is also known as "Key Holder A." Then, $p \Rightarrow p'$ where p' is "Key Holder A."

Figure 15:
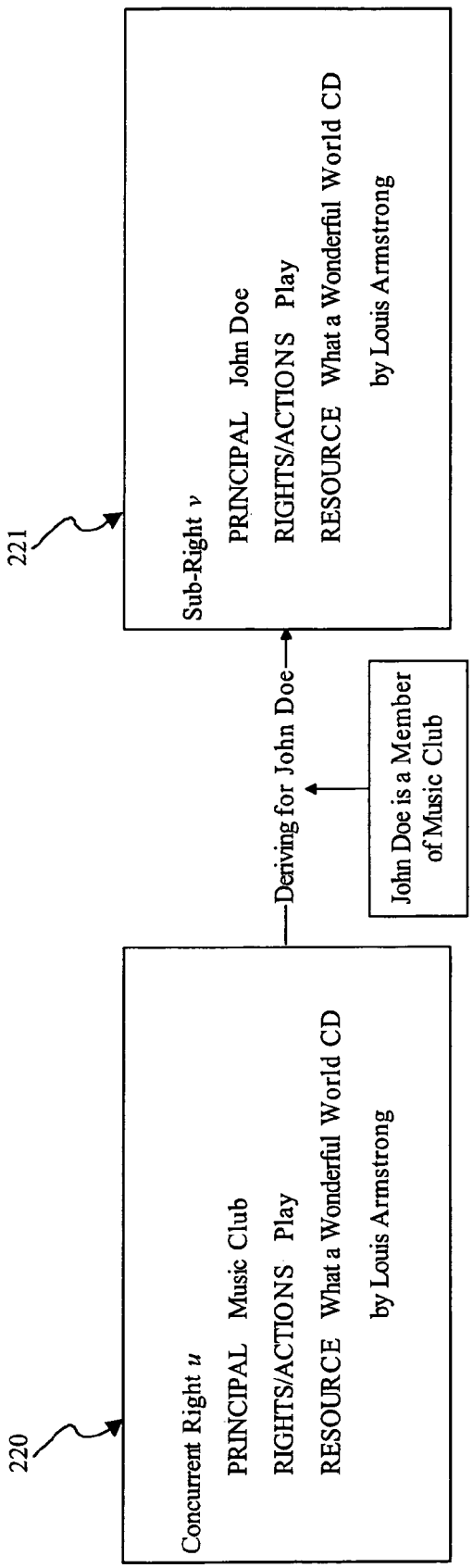
FIG. 15 illustrates a scenario in which a new right is derived from an unconditional concurrent right.

FIG. 15 illustrates a concurrent right u (220) that grants each member of the Music Club unlimited rights to play the "What a wonderful world" CD by Louis Armstrong. In this example, the principal John Doe is a member of the Music Club. Therefore, John Doe can derive the sub-right v (221) that grants the principal John Doe unlimited rights to play the same CD.

Figure 16:
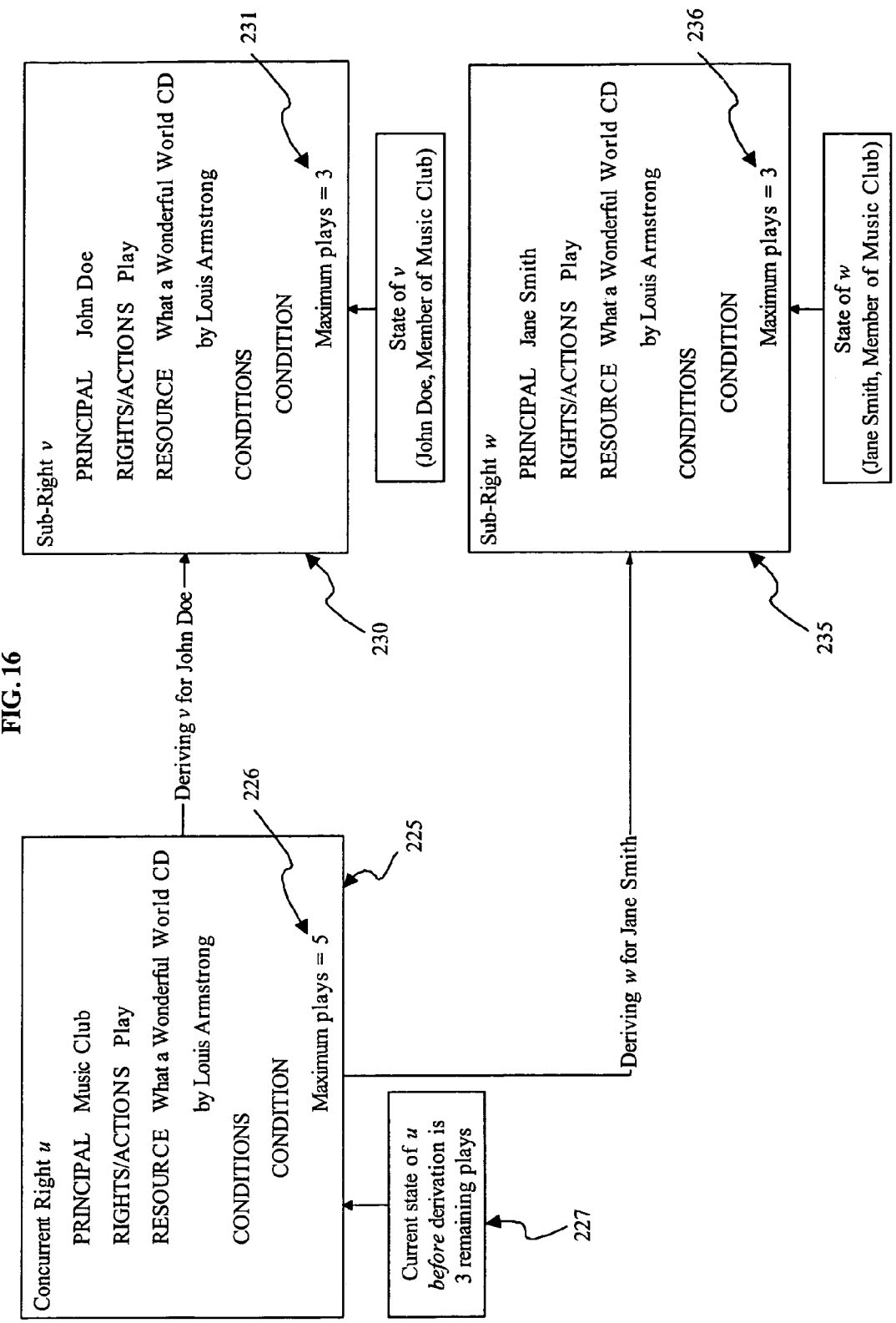
FIG. 16 illustrates a scenario in which a new right is derived from a conditional concurrent right.

FIG. 16 illustrates a concurrent right u (225) that contains a state condition 226. In this example, the concurrent right specifies that members of the Music Club may play the "What a wonderful world" CD by Louis Armstrong five times. The current state 227 before the derivation is that three plays remain. When deriving sub-rights v (230) and w (235), the current state for the state condition in the concurrent right (three plays remaining from an original maximum of five) is reproduced in each of the sub-rights as conditions 231 and 236, respectively. After the derivation, the condition states for the sub-rights v and w are tracked independently. Condition states for each member of the group can be tracked on the central authorized server, on the user device, and so on.

Shareable Rights

A shareable right is a right from which sub-rights can be derived based on both the principal and the states of its divisible conditions, if any. Thus, a sharable right specifies the maximum rights that can be shared among specified principals. When a derived principal derives a sub-right from a shareable right, conditions states are deducted from the shareable right according to the condition states apportioned to the derived sub-rights.

Concurrent rights and divisible rights are special cases of sharable rights. IN particular, a concurrent right is a special case of a sharable right without divisible conditions, and a divisible right is a special case of a sharable right with at least one divisible condition but with a principal from whom no derivation is possible (the principal doesn't specify a group).

The main difference between shareable rights and concurrent rights is how the states for state conditions in derived sub-rights are tracked. Since state conditions in concurrent rights are not divisible, the condition states for each derived sub-right are tracked independently (state is tracked separately for the principal of each sub-right). Since state conditions in sharable rights are divisible, the condition states for the derived sub-rights are shared (all derived sub-rights point to the same state for each divisible condition). This results in the principals for sub-rights sharing the condition states.

Figure 17:
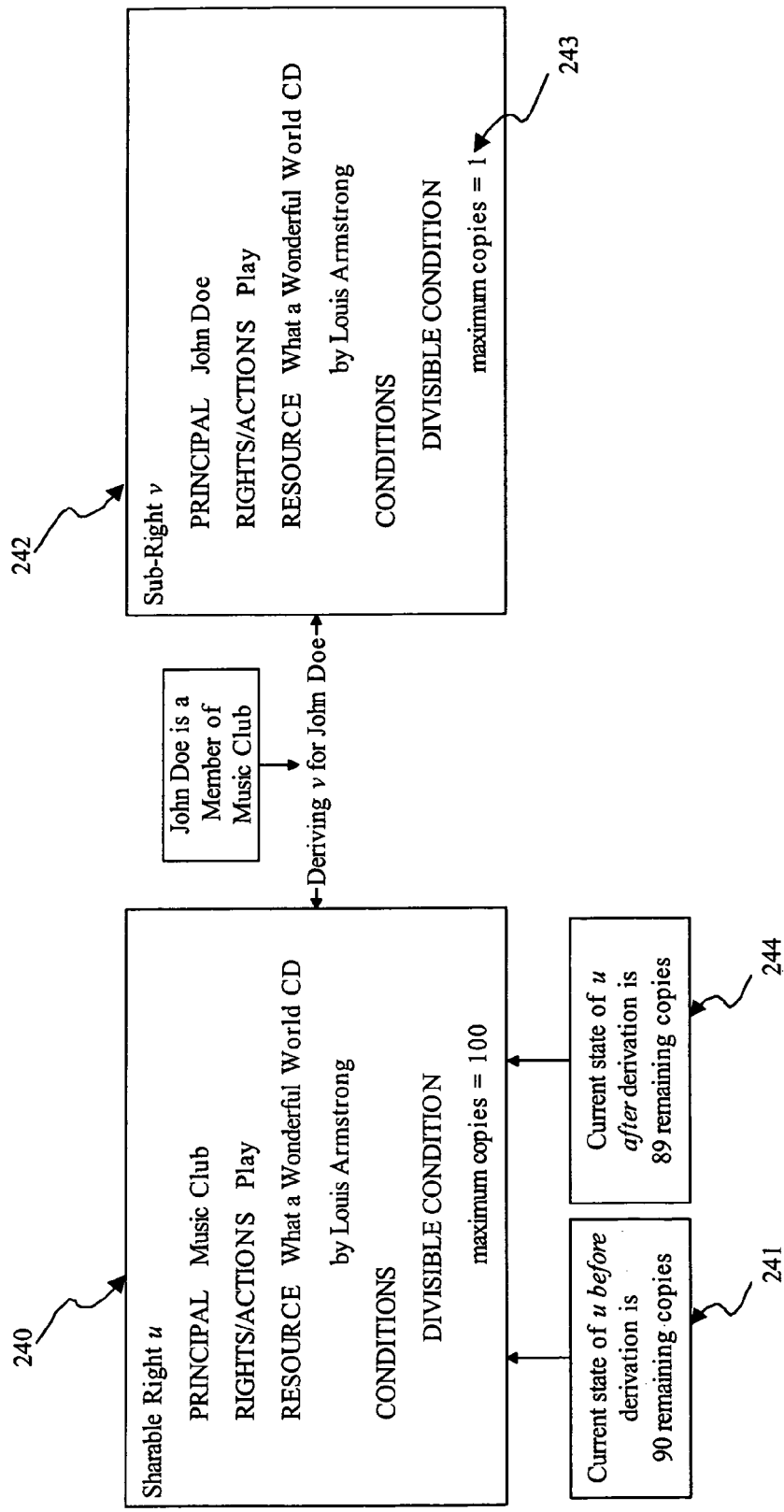
FIG. 17 illustrates a scenario in which a new right is derived from a shareable right.

FIG. 17 illustrates the shareable right u (240) that grants the Music Club the right to own 100 copies of the "What a wonderful world" CD and distribute these 100 copies among its members. In this example, the current state 241 of the divisible condition indicates that 10 copies have been distributed so far and 90 copies remain. The principal John Doe, a member of the Music Club, is granted one copy of the CD in sub-right v (242). The sub-right v is derived from the sharable right u with a state 243 of one copy. The current state 244 of the divisible condition in the sharable right u is reduced to 89 remaining copies. Thus, where the right contains a state condition, state values for each state condition in the sub-right may be apportioned based on the permissible state values of the corresponding state condition in the right and its current state. The apportioning may include deriving from a state condition specifying a maximum count, wherein the current state of the state condition denotes an accumulated count. The apportioning may also include deriving from a state condition specifying a range of values, wherein the current state of the state condition denotes the sub-ranges of the specified range that are no longer available.

There are many applications that can utilize characteristics of shareable rights, including applications for divisible rights and concurrent rights. One such application, called "group license," is described below.

Group License

A group license is a license that grants maximum rights to one or more authorized users, allowing the authorized users to share the granted rights according to their own sharing policies among themselves or with another set of authorized users, allowing the authorized users to return the shared rights or further share each shared right with other authorized users. Thus, a group license is a shareable right that allows the sub-rights to be returned or integrated back to the group license.

As defined within the invention, a license is a right granted to some users. Thus, the term "license" and "right" are interchangeable. Many DRM systems may have different definitions of a license, but a license must at least contain a granted right. Thus, the definitions of licenses used by DRM systems can all be mapped to the definition of a license in this invention. For example, in the MPEG REL, the term "license" is a set of granted rights plus other information (such as information about the issuers, the integrity of the license, and so on). So, an MPEG REL license can be mapped into multiple licenses as defined in this invention.

The concept of a group license as defined above can be implemented using the concepts of shareable rights and integration of rights. A group license is a shareable right, so it can be dynamically divided for sharing among authorized users and/or groups of authorized users. When a group license is divided for sharing, a new license is created and the condition states specified in the group license are adjusted to deduct the condition states specified in the new license. The new license that is created is called a shared license, and it is also a group license. Thus, a shared license can be consumed by authorized users or further divided for sharing among authorized users and/or groups of authorized users.

Since the shared license is also a group license, the right grantee of a shared license can act as a rights grantor to further derive new shared licenses from its shared license for downstream sharing. Therefore, dynamic rights sharing, such as multi-tier rights sharing, sharing based on the rights grantee's discretion, or sharing between different groups of principals and/or devices, is supported.

Once created, a shared license is available for consumption. Each time a shared license is used, its condition states are updated to reflect that usage. At any time, a shared license's remaining rights can be returned to the group license from which it was derived using the method of integration of rights as disclosed above.

The concept of a group license covers all aspects of rights and resources sharing: sharing among devices, sharing among users, sharing among organizations, and so on. Group license can be a basic building block for many applications that enable dynamic sharing of rights and resource. Such applications include, but are not limited to, the following:

Library: A library is granted a group license for a certain number of copies of a book entitled "Gone with the Wind." At any time, the library can lend a copy of the book to a library member by deriving a shared license from its group license. When the library derives a shared license, the total number of available copies is decremented until the library member returns the book.

Home network: A user's home network includes many be different devices with different DRM capabilities. The user wants the convenience of purchasing a license for use within the user's home network without specifying in advance which network device will consume the license. To do this, the user acquires a group license and derives a shared license from it for a specific device in the home network.

Membership: Members of a group want to derive specific licenses for themselves instead using the general license granted to the group, because user devices may be unable to enforce a general license.

The following examples illustrate the concept of a group license and how to derive shared licenses from a group license.

Figure 18:
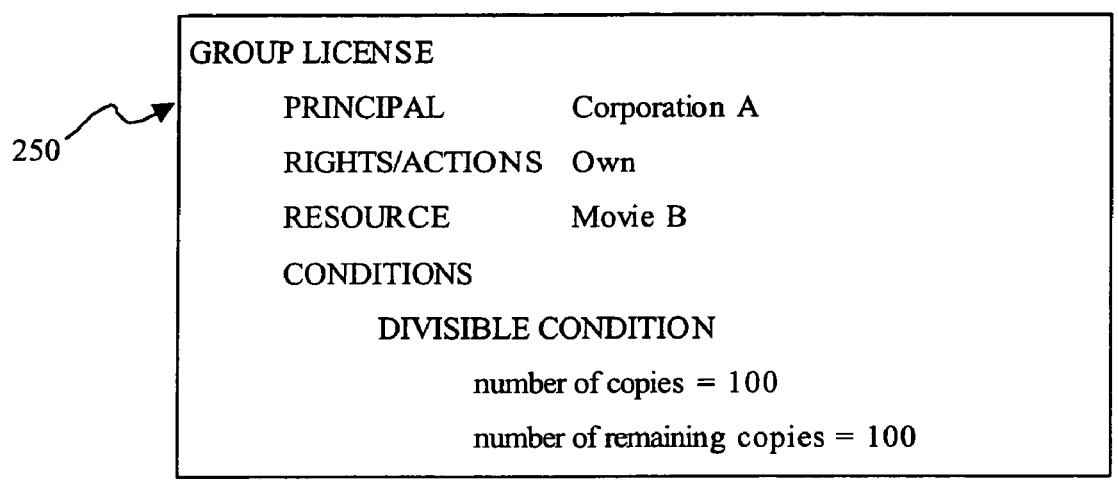
FIG. 18 illustrates a group license.

FIG. 18 illustrates a group license 250 that grants Corporation A rights for 100 copies of the movie B. When first created, the group license contains a divisible condition stipulating 100 as the maximum number of copies and a current state of 100 copies remaining. Corporation A may divide the pool of 100 copies of the movie B among its employees or groups of employee according to business needs.

Figure 19:
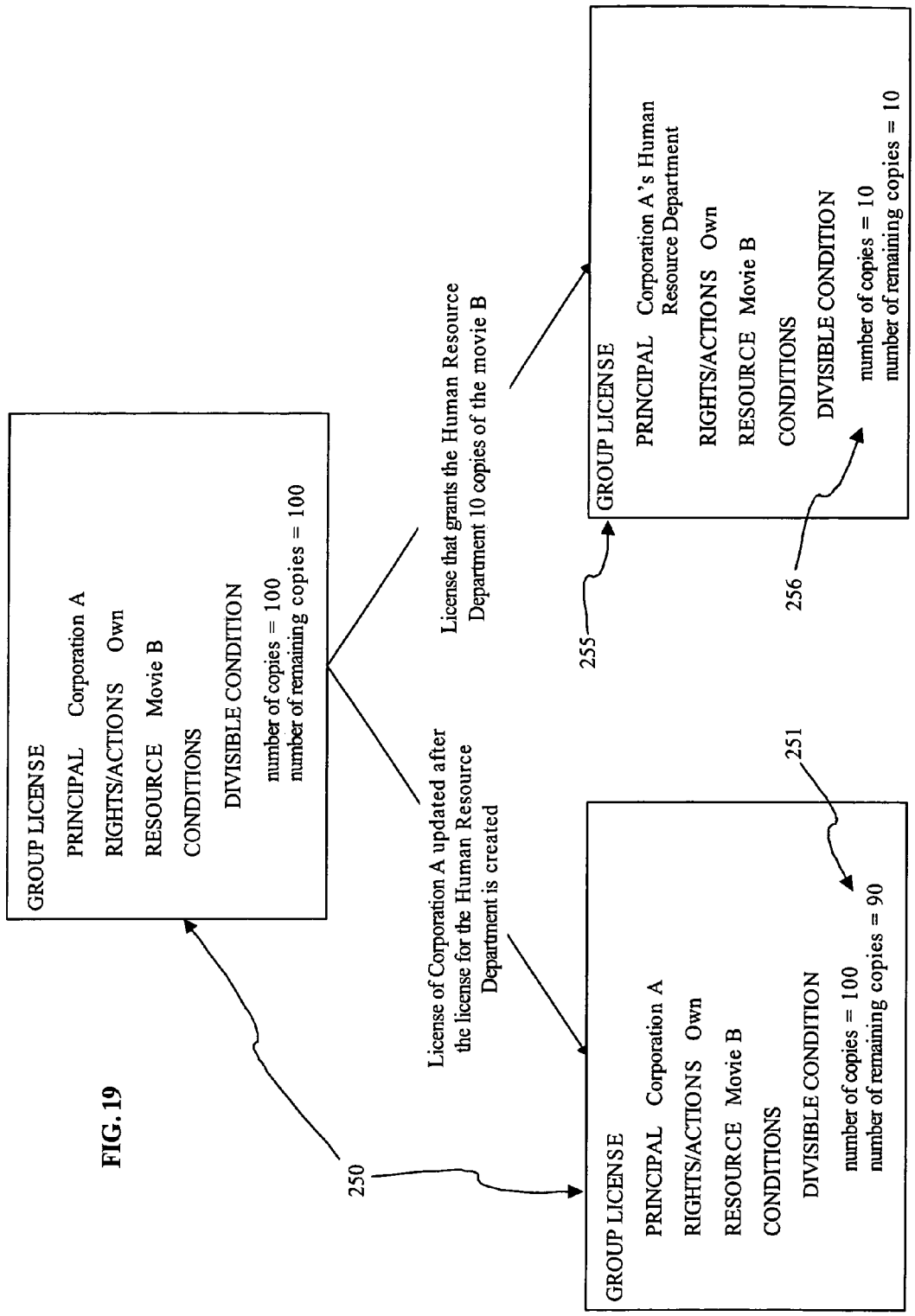
FIG. 19 illustrates a scenario in which a new group license is derived from a group license.

FIG. 19 illustrates Corporation A granting its Human Resource department 10 copies of the movie B from its pool of 100 copies in group license 250. Corporation A derives a shared license 255 that grants the Human Resource Department the rights to 10 copies of the movie B, as reflected by condition 256. FIG. 19 also illustrates how the condition states 251 in the group license illustrated in FIG. 18 are updated, deducting 10 copies from the pool of 100 copies so that 90 copies remain.

Figure 20:
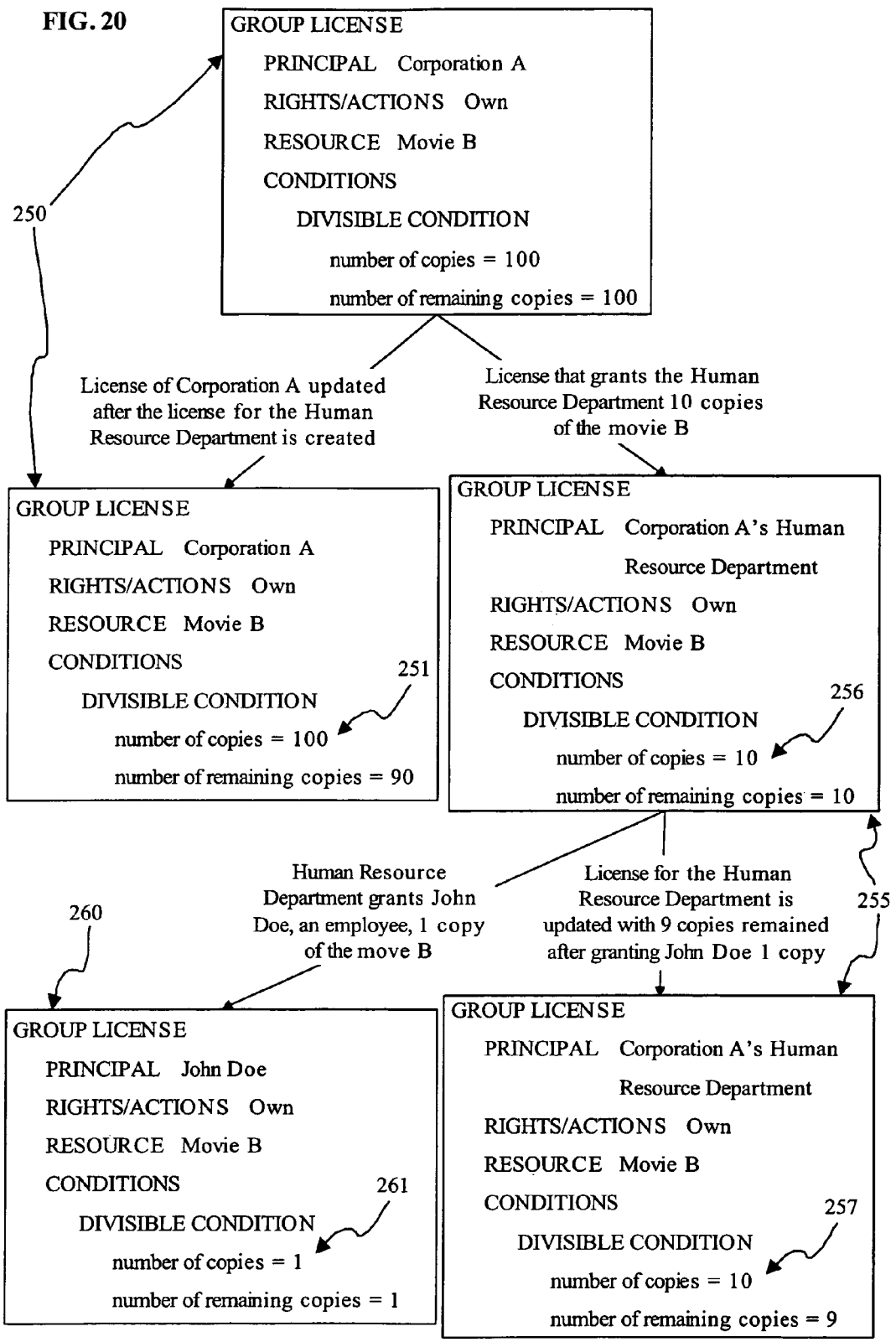
FIG. 20 illustrates the process of deriving a second-generation group license.

The shared license 255 that Corporation A grants to the Human Resources department is also a group license that can be further divided. FIG. 20 illustrates Corporation A's Human Resource department granting one of it's employees, John Doe, rights for one copy of the movie B, as reflected in group license 257 and condition 261. FIG. 20 also illustrates how the condition states 256 in the Human Resource department's license are updated to condition states 257, deducting one copy from its pool of 10 copies so that nine copies remain. FIG. 20 also illustrates that the act of the Human Resource department granting John Doe one copy of the movie B does not affect the condition states 251 in the original group license for Corporation A (Corporation A still has 90 remaining copies).

Figure 21:
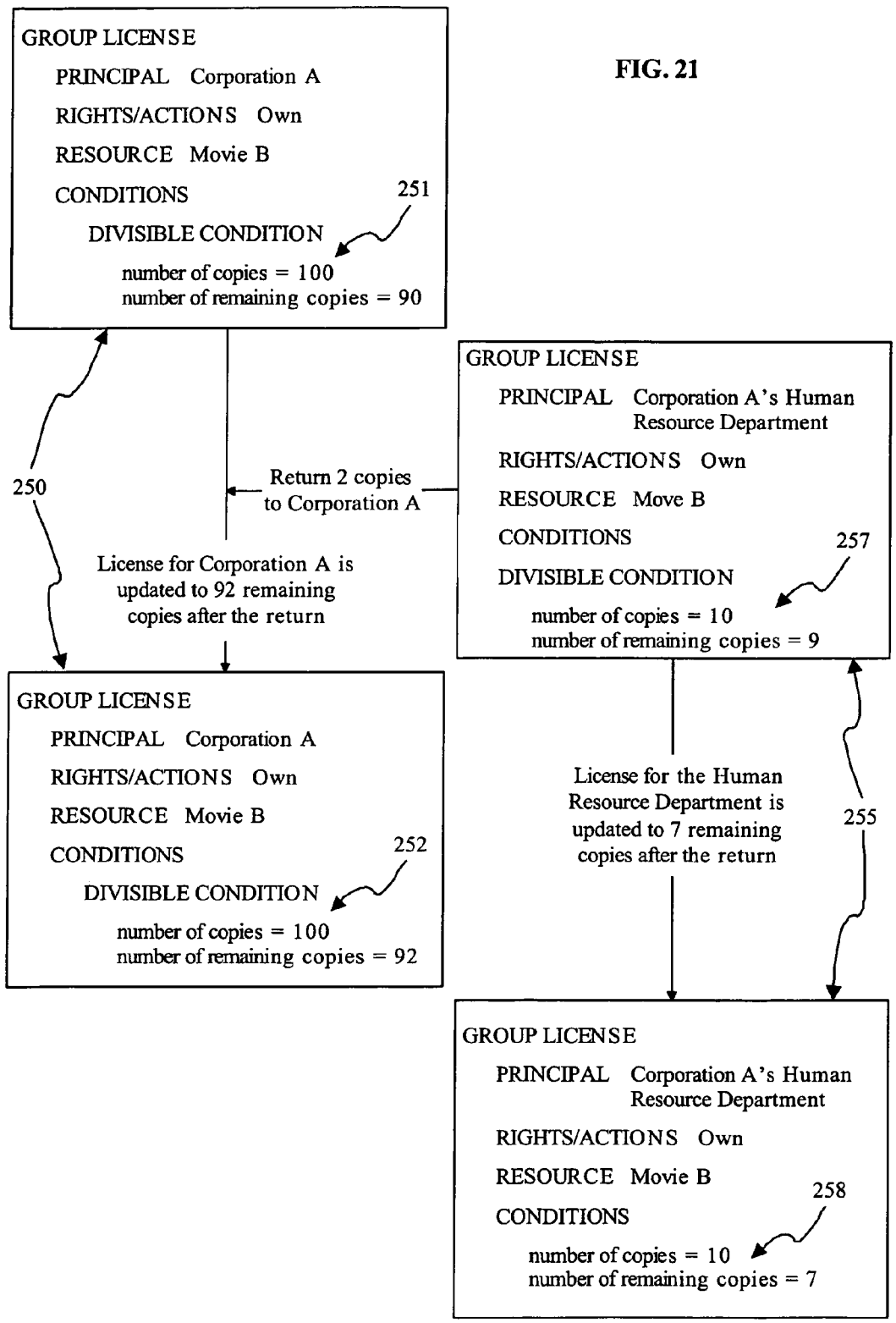
FIG. 21 illustrates a scenario in which rights are returned to a group license.

After granting John Doe one copy of the movie B, the Human Resource department decides to return two of its nine remaining copies back to the Corporation A, as illustrated in FIG. 21. After the return, the number of remaining copies for the Corporation A's group license 250 increases by two from the 90 copies in condition state 251 to 92 copies in conditions state 252, while the number of remaining copies for the Human Resource department's license 255 decreases by two from the nine copies in condition states 257 to seven copies in condition states 258.

Figure 22:
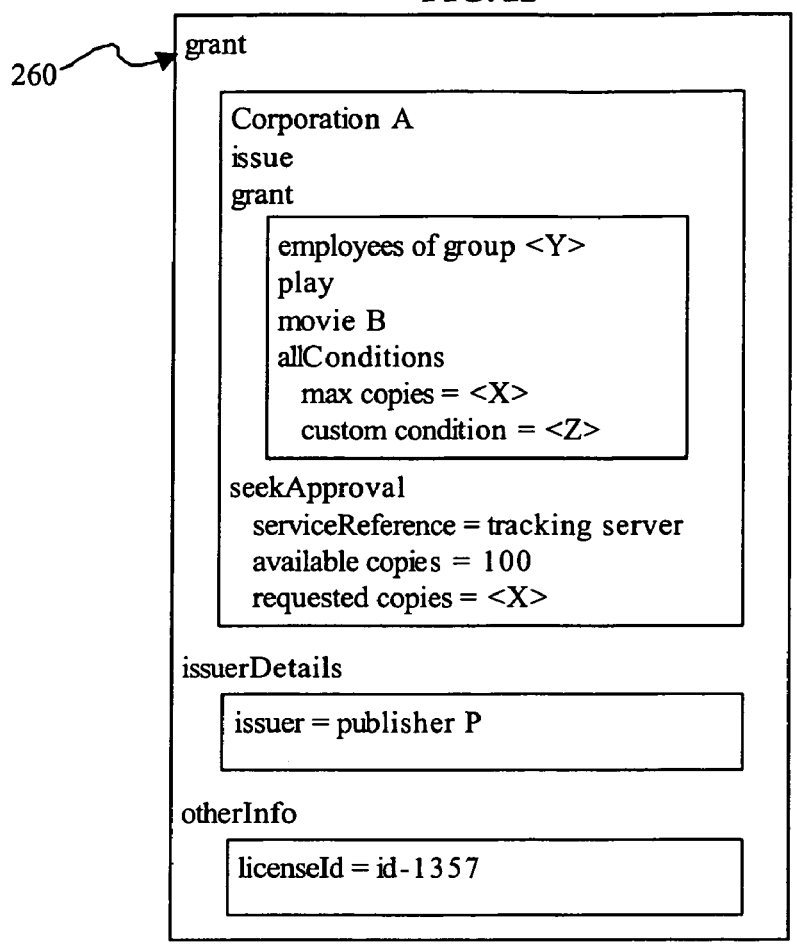
FIG. 22 illustrates an MPEG REL representation of the group license illustrated in FIG. 18.

FIG. 22 illustrates a pseudo MPEG REL representation 260 of the Corporation A's group license (illustrated in FIG. 18) that allows sharing of a pool of 100 copies of movie B. Corporation A may divide this pool among groups of employees by issuing each group a shared license as long as the total number of copies does not exceed the pool capacity. The right to distribute is specified using the issue right, which is conditional upon the seekApproval condition. The seekApproval condition relies on a tracking server to track the remaining number of copies in the pool and the number of copies requested for a shared license. The usage right that can be distributed is contained in the inner grant. It contains the variable Y as a placeholder for the identity of the receiving user group, the variable X as a placeholder for the number of copies assigned to a receiving group, and the variable Z as a placeholder for any custom conditions that Corporation A may want to add to the shared licenses.

Figure 23:
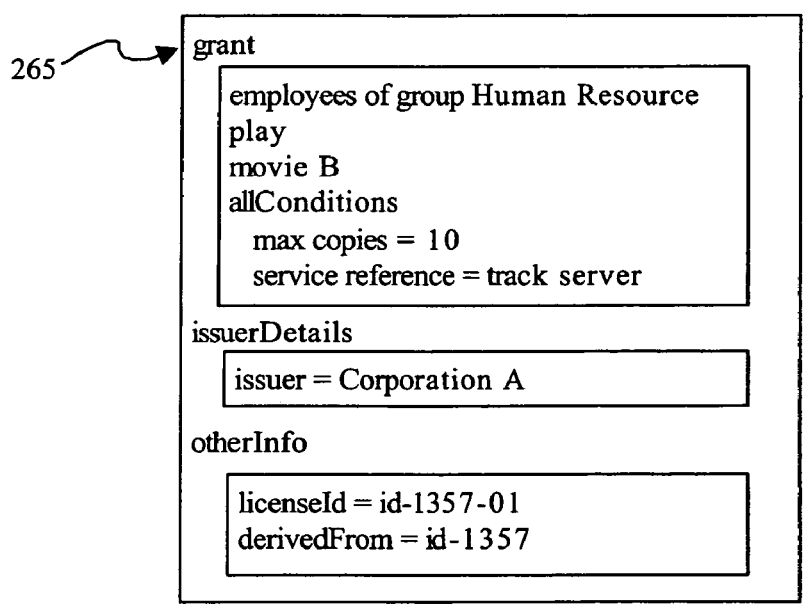
FIG. 23 illustrates an MPEG-REL representation of the group license illustrated in FIG. 19.

FIG. 23 illustrates a pseudo MPEG REL representation 265 of the license for the Corporation A's Human Resource department (illustrated in FIG. 19). The variables Y, X, and Z are replaced by Human Resource (the identification of the receiving group), 10 (the number of copies assigned to Human Resource), and report usage (requiring all usages be tracked by the specified server). The other info identifies the current license and the license from which the current license derives.

Figure 24:
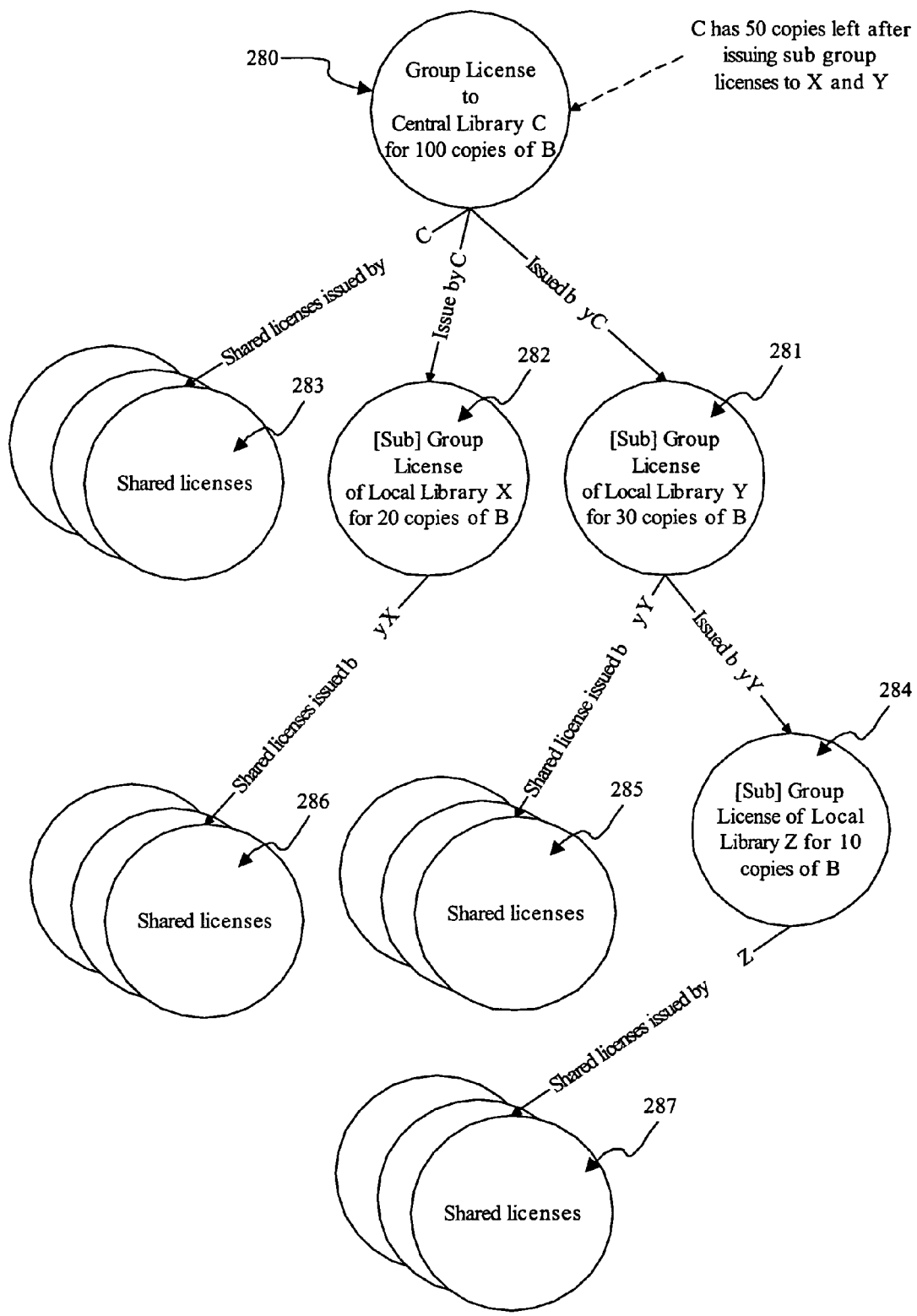
FIG. 24 illustrates a derivation hierarchy for group licenses.

FIG. 24 illustrates a use case in which both sub-group licenses and shared licenses are derived from a group license. A central library C acquires a group license 280 that allows a book B to be copied 100 times. The central library creates sub-group licenses 281 and 282 from its group license for local libraries depending on their need. C distributes 20 copies to local library X in sub-group license 282 and 30 copies to local library Y in sub-group license 281. Local library Y further distributes 10 of its copies to library Z in sub-group license 284. Furthermore, shared licenses 283, 286, and 287 may be issued from group license 280, sub-group license 282, sub-group license 281, or sub-group license 284.

System that Supports Dynamic Rights and Resources Sharing

Figure 25:
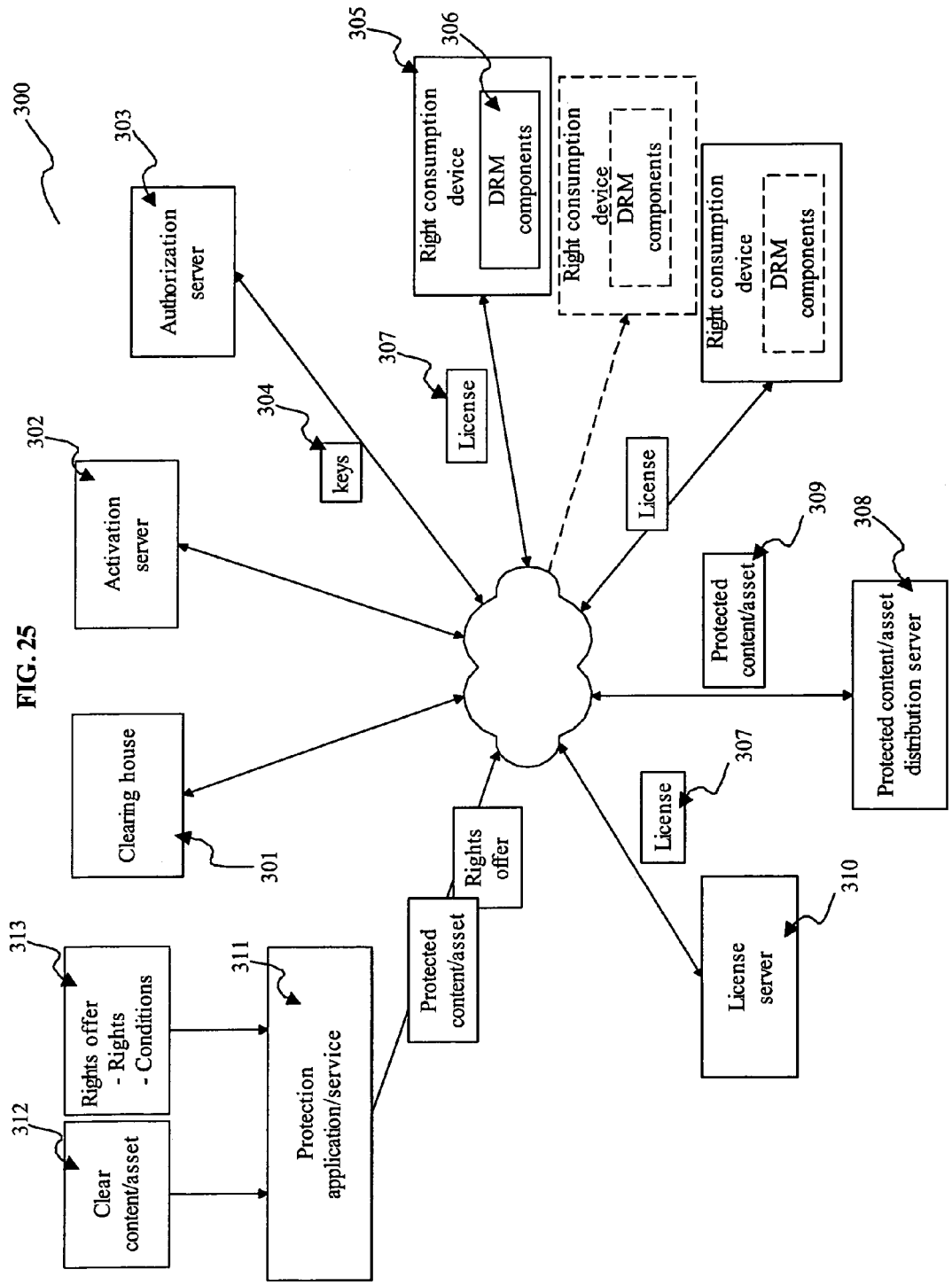
FIG. 25 illustrates a typical DRM system.

The concept of a group license as disclosed above covers all aspects of rights sharing. It can be implemented by any DRM system capable of authorizing the consumption of shareable rights, issuing a license that contains the distributed shared rights, and managing the states of rights for both the group license and shareable rights. FIG. 25 illustrates an example of such a DRM system. A DRM system 300 includes, for example, an activation server 302, an authorization server 303, one or more right consumption devices 305, a protected content/asset distribution server 308, a license server 310, and a protection application/service 311. Authorization server 303 may be associated with one or more keys 304. The rights consumption devices 305 include DRM components 306, and may be associate with one or more licenses 307. Protected content/asset distribution server 308 may distribute protected content/asset 309. License server 310 provides licenses 307 to the system. Protection application/service 311 provides clear content/asset 312 and rights offer 131, which may include rights and conditions.

Figure 26:
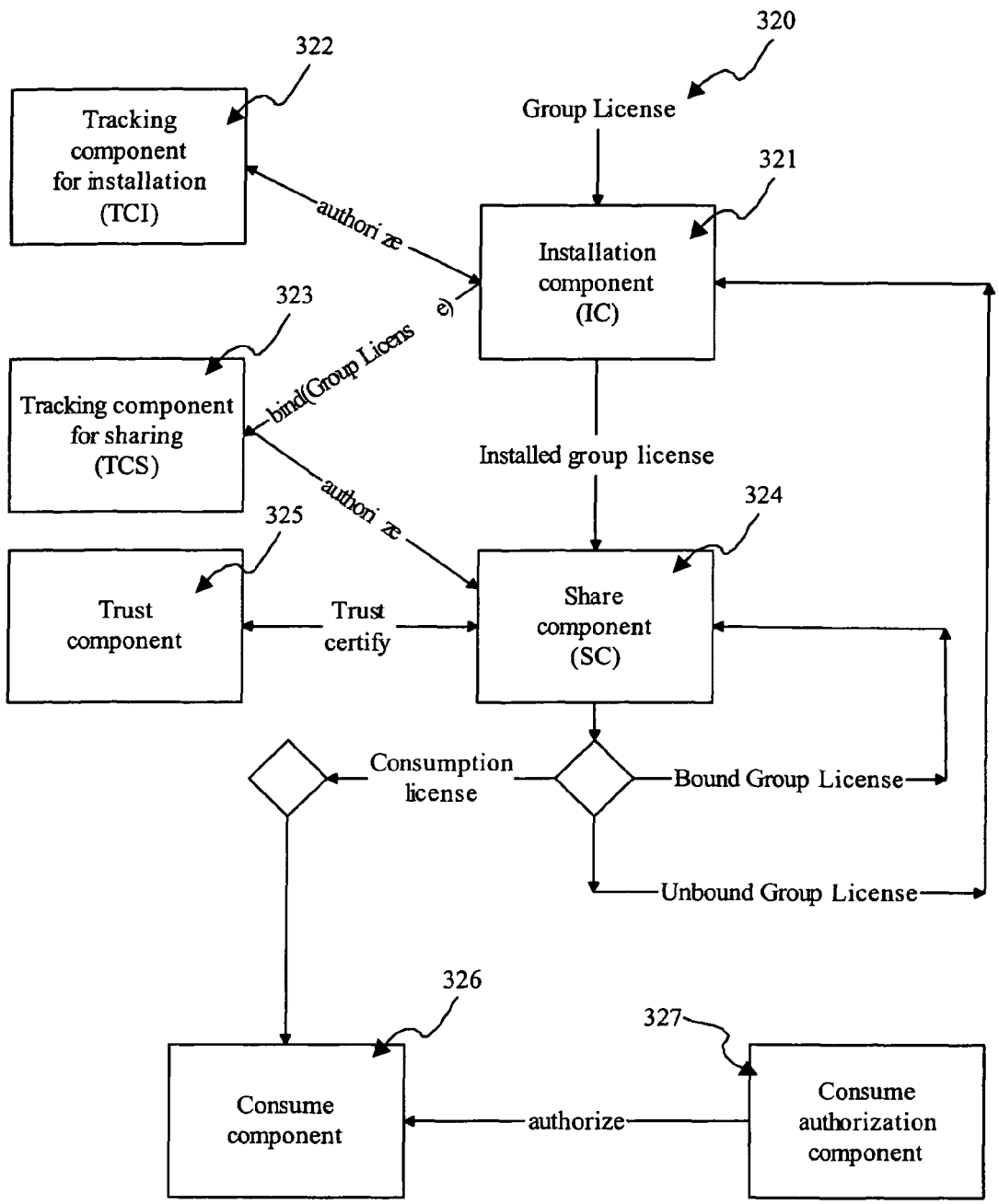
FIG. 26 illustrates basic components that support dynamically sharing rights.

FIG. 26 illustrates the basic components of a system that supports dynamic rights and resources sharing. These components include an installation component 321, a tracking component for installation (TCI) 322, a tracking component for sharing (TCS) 323, a share component 324, a trust component 325, a consume component 326, and a consume authorization component 327. Each component can be implemented as a hardware component, a software component, a device, a service, and so on. Once issued by an authority, a group license may or may not be bound to a specific environment from which its usage is tracked. In the preferred embodiment of this invention, the group license is not bound initially (upon license issuance) to an environment. This process provides greater flexibility, because the group license can be acquired anywhere and at any time without being confined to a specific environment.

As illustrated in FIG. 26, if group license 320 has not been bound to an environment, it must be installed by installation component (IC) 321 before it can be shared or used. TCI 322 authorizes the installation. The purpose of the installation is to make sure that the group license 320 has not been installed previously and then to bind the group license to a tracking component 323, called the tracking component for sharing (TCS), that tracks the state of rights of the group license.

Although the states of rights of the group license can be stored on any devices, the state of rights must be certified and verified by the sharing component, which controls the rights sharing. For example, the states of rights can be stored on the same device as the installed group license, stored on the same device as the authorization component to which the group license is bound, stored on a remote service, or stored within the group license. Various possible storage strategies for the state of rights are illustrated in FIG. 17, FIG. 18, FIG. 19, FIG. 20, FIG. 21, and other figures in this invention. If the state of rights is stored within the group license itself, the group licenses is transformed each time the states of rights are updated (because the license has been consumed or the rights exercised) to reflect the new states. If the group license with the new states is a replacement group license, the original group license becomes invalid once it has been transformed to reflect the new states in the replacement group license.

Once installed, a group license is called an installed group license and is available for sharing. The sharing component (SC) 324 processes a request for sharing by interpreting the installed group license, retrieving the current state of rights from the TCS 323, verifying its current state of rights against the request, and creating the shared license (if authorized). The shared license derived from the installed group license may be made available to the trust component 325 for trust-certification.

The shared license is itself a group license that may be available for further sharing. It may be in one of the following forms:

Bound group license: This type of license is bound to a TCS when it is created. The TCS to which the shared license is bound may be the same or different from the TCS to which the installed group license is bound. For small organizations, the tracking components may be the same, but the tracking components may be different for large organizations or a diverse group of principals.

Unbound group license: This type of license is not bound to a specific TCS when it is issued but can later be bound to a TCS. This type of license is generated when the target consumption environment or the target TCS is not known when the license is generated (for example, creating a license for sharing with another group of rights grantees, another network, and so on). In another scenario, the license grantor wants to offer more flexibility in the license by keeping the option open for binding to a TCS. Under this circumstance, it is also possible to delegate the TCS binding authority to the license grantee or another party.

Consumption license: This type of license is created mainly for consumption instead of sharing. However, it can be shared among authorized principals or devices.

The basic components illustrated in FIG. 26 can be used to design systems in different configurations. If a consumption license is created, consume component 326 enables the consumption of the resource if authorized by consume authorization component 327.

Figure 27:
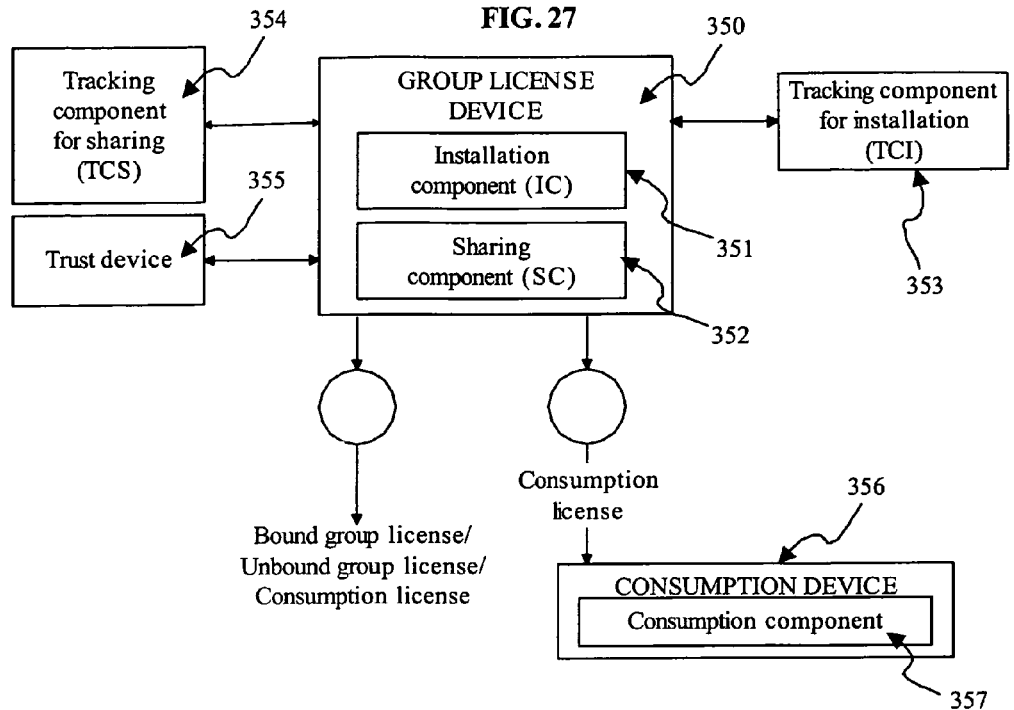
FIG. 27 illustrates one possible configuration of the basic components that support sharing rights.

FIG. 27 illustrates one preferred embodiment that includes two main devices: a group license device 350 and a consumption device 356. The group license device 350 contains the installation and sharing components, 351 and 352, respectively. It handles all requests for group license installation, un-installation, and shared license creation. The consumption device 356 includes a consumption component 357 for consuming the license. In this example configuration, the tracking component for installation (TCI) 353, TCS 354, and trust component 355 are external to the group license device 350. The sharing authorization device tracks the state of rights for all installed group licenses that have been bound to it.

Figure 28:
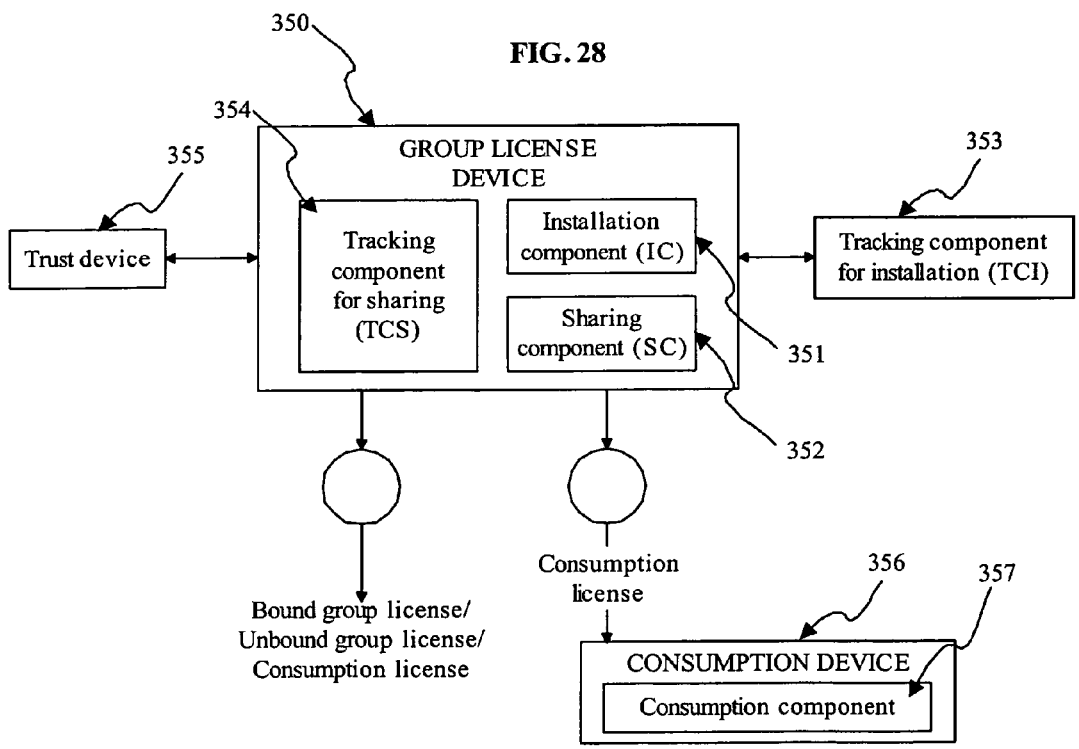
FIG. 28 illustrates one possible configuration of the basic components that support sharing rights.

FIG. 28 illustrates another preferred embodiment that uses an alternative configuration. In this embodiment, the TCS 354 is internal to the group license device 350. In this configuration, the group license device 350 processes the request for sharing and tracks the states of rights for all installed group licenses. Thus, the group license device 350 can authorize a request for sharing without requiring an external TCS. Once the request for sharing has been authorized, the group license device 350 creates a shared license and makes the shared license available to the trust device 355 for trust certification.

Figure 29:
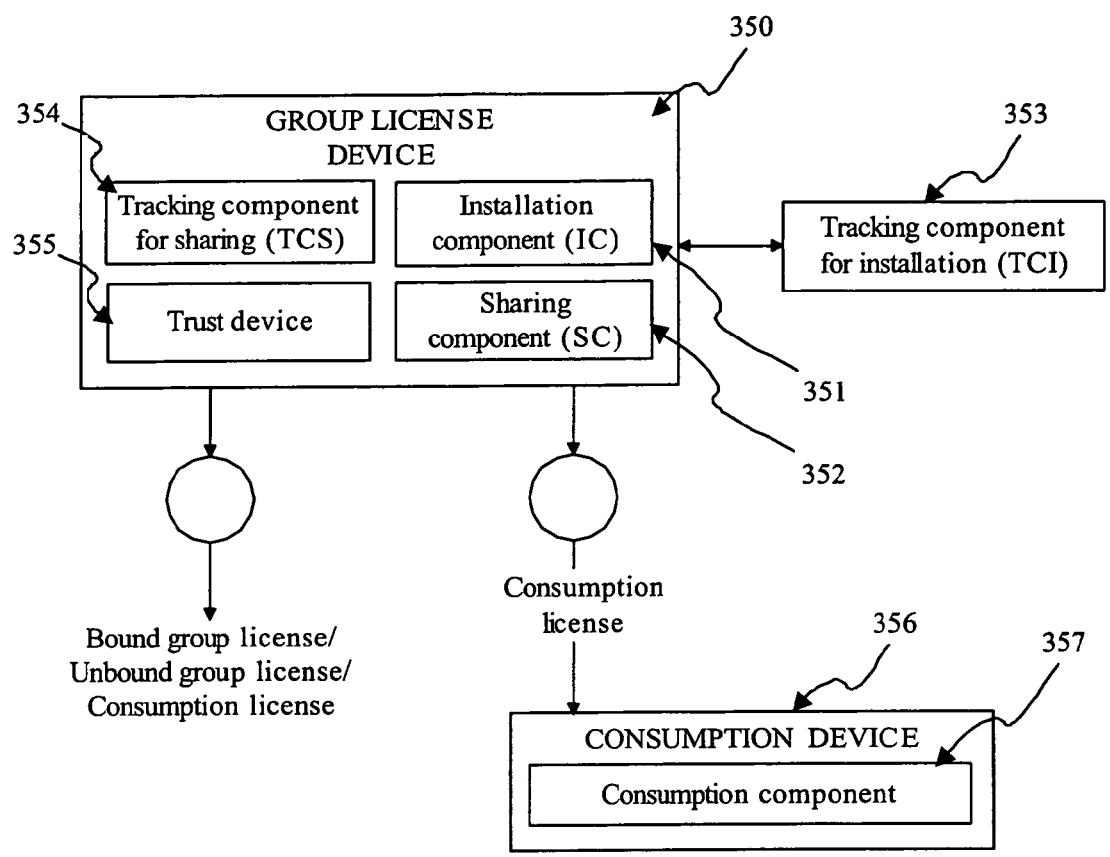
FIG. 29 illustrates one possible configuration of the basic components that support sharing rights.

FIG. 29 illustrates yet another preferred embodiment that uses a different alternative configuration. In this configuration, both the TCS and trust components, 354 and 355, respectively, are internal to the group license device 350. The group license device 350 processes all the sharing requests, tracks the state of rights for all installed group licenses, and certifies the shared licenses generated by the device. This is the most practical configuration for integration with the current state-of-the-art DRM systems.

Figure 30:
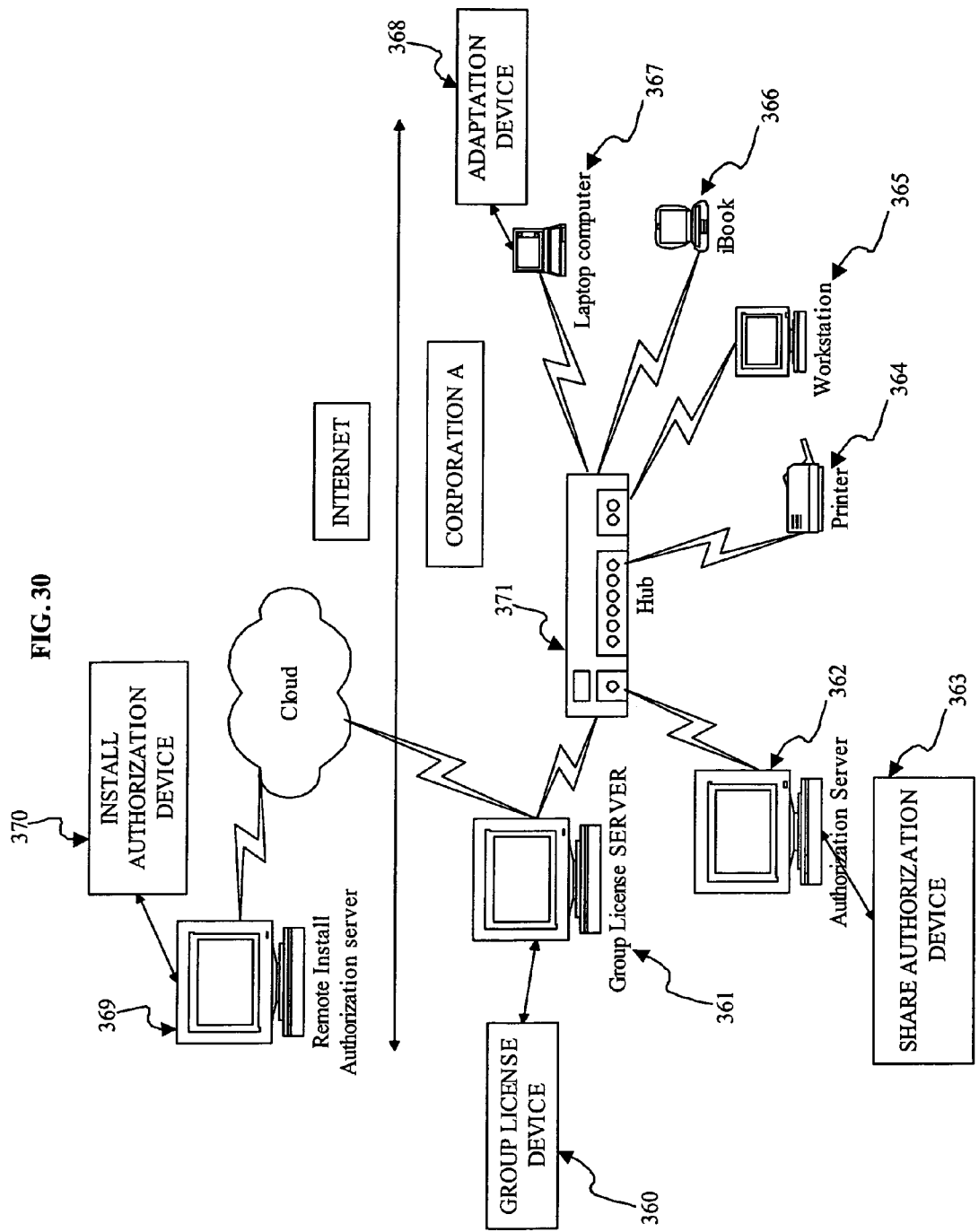
FIG. 30 illustrates one possible configuration of the basic components for a corporation application.

FIG. 30 illustrates an application of the configuration illustrated in FIG. 29 for a Corporation A. Within Corporation A's network, the group license device 360 is installed on a group license server 361. The group license device 350 is dedicated for processing all sharing requests for all devices within the corporation's network. The group license server 361 is connected to the installation authorization server 369 including install authorization device 370 via the network for authorizing all the installation of group license requests. Corporation A also dedicates an authorization server 362, which has the sharing authorization device 363 installed, to track all the states of rights of group licenses used within the corporation. In addition, Corporation A's network may include other devices, such as printer 364, workstation 365, iBook 366, and laptop computer 367, which may include an adaptation device 368. Communication within the network may be facilitated via hub 371, for example.

Tracking Components

The tracking component is present in any DRM system. The function of the tracking component is to track the usage or state of rights. Within the present invention, tracking includes tracking the installation status of a group license and tracking the states of rights for the installed group license. In the present invention, the component that tracks installation is called the tracking component for installation (TCI), and the component that tracks the states of rights for the group licenses is called the tracking component for sharing (TCS).

The functions of TCI and TCS can be implemented by the same component or different components. These functions can be configured to be in the same device or service, or different devices or services. No matter where the tracking devices or services are located, they must be trusted by other components in the systems that support dynamic rights sharing. There are many known mechanisms to establish such trust, such as certification by an authority that is trusted by all components within the system, and so on.

Tracking Component for Installation (TCI)

This component tracks the installation status of the group license along with the initial state of rights of the installed group license and the identification of the tracking component for sharing (TCSID) that tracks the state of rights for the installed license. As mentioned above, the purposes of tracking the installation status is to ensure that the group license can be bound only to a TCS that tracks its states of rights.

Figure 31:
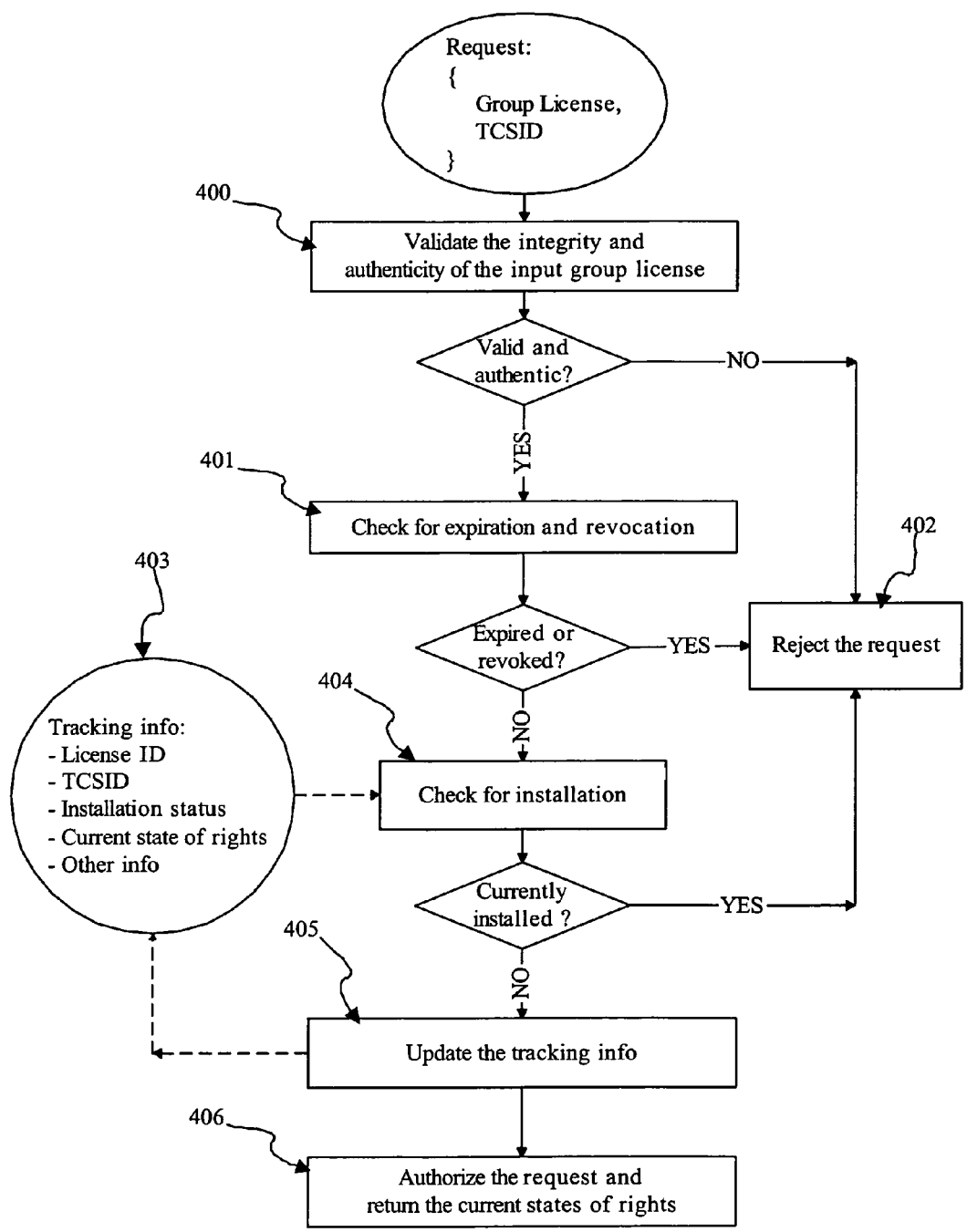
FIG. 31 illustrates the process of installing a group license.

FIG. 31 illustrates how the installation request is tracked. Input to the process includes the group license and the TCSID of the TSC. The integrity and authenticity of the group license are validated at step 400. The integrity is validated to ensure that the group license has not been changed or tampered with. The authenticity is validated to ensure that the group license is issued by an authority trusted by the TCI. If the input group license is valid and authentic, the group license is checked for expiration and revocation at step 401. The IAC then retrieves the tracking information at step 403 and checks whether this group license is currently installed at step 404. If the group license is not valid, not authentic, expired, revoked, or currently installed, the request is rejected at step 402. If not, the initial states of rights are initialized from the group license and the tracking information is created at step 405 and updated at step 406 with the initial states of rights.

If the group license was installed before but is not currently installed, the TCI verifies the states of rights to ensure that the rights specified in the group license are still valid. If not, the installation request is rejected.

If tracking information is not found or indicates that the group license has never been installed, new tracking information is created and updated with the initial states of rights and the tracking information is marked as installed. If the group license was installed before and the rights are still valid, the tracking information is marked as installed.

Figure 32:
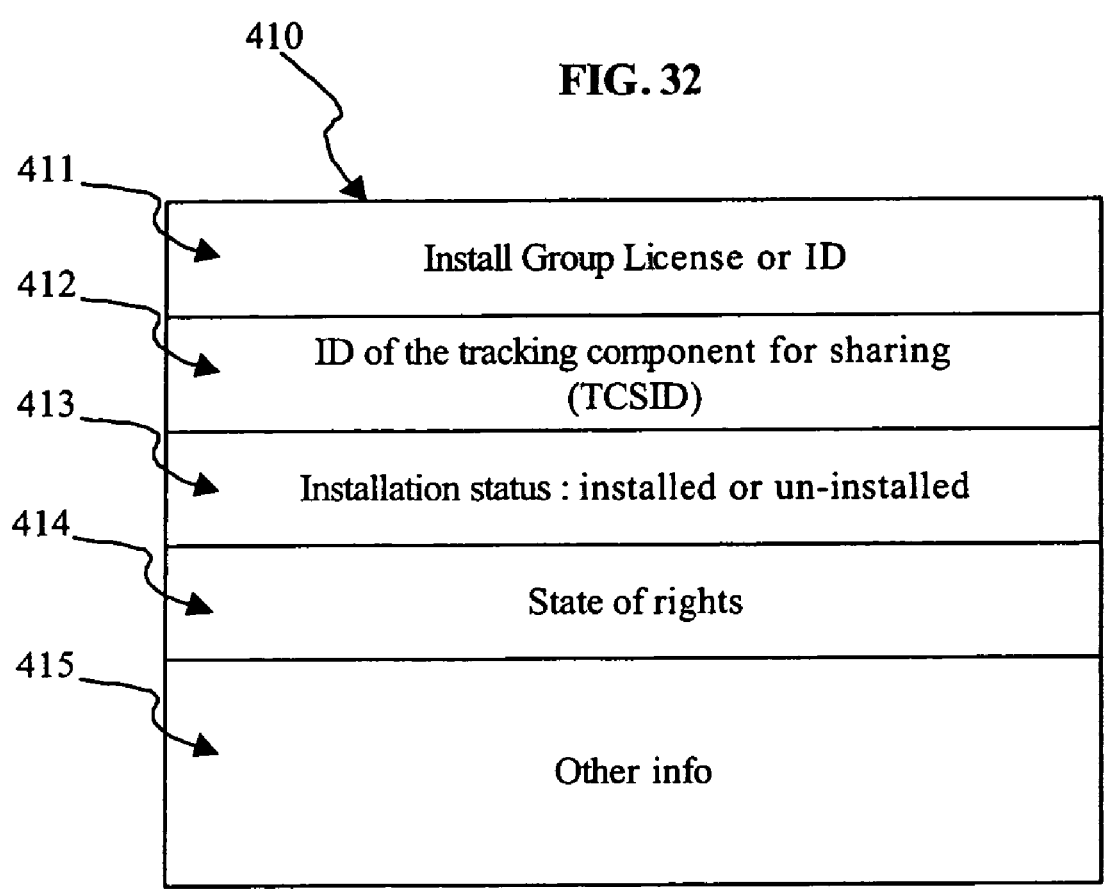
FIG. 32 illustrates a preferred structure of tracking information.

FIG. 32 illustrates a preferred structure of tracking information 410. It contains the installed group license or license ID 411, the TCSID 412 of the component tracking the states of rights (used during the process of un-installation), the current installation status 413, the state of rights 414 for the group license at the time it is first installed or at the time it is un-installed, and other information 415 needed by the application.

Once the installation request is granted, the current states of rights stored in the tracking information are returned to the requester, which is the installation component (IC). The installation component then passes the states of rights to the sharing component (SC), so that the initial states of rights of the group license can be initialized.

Once the group license is installed, it cannot be installed again until it is first un-installed. The process of un-installation releases the group license from the TCS currently tracking its states of rights. The process of un-installation requires the installed group license or the license ID and the request message. The request message is an authenticable message that contains the current states of rights for the group license.

Figure 33:
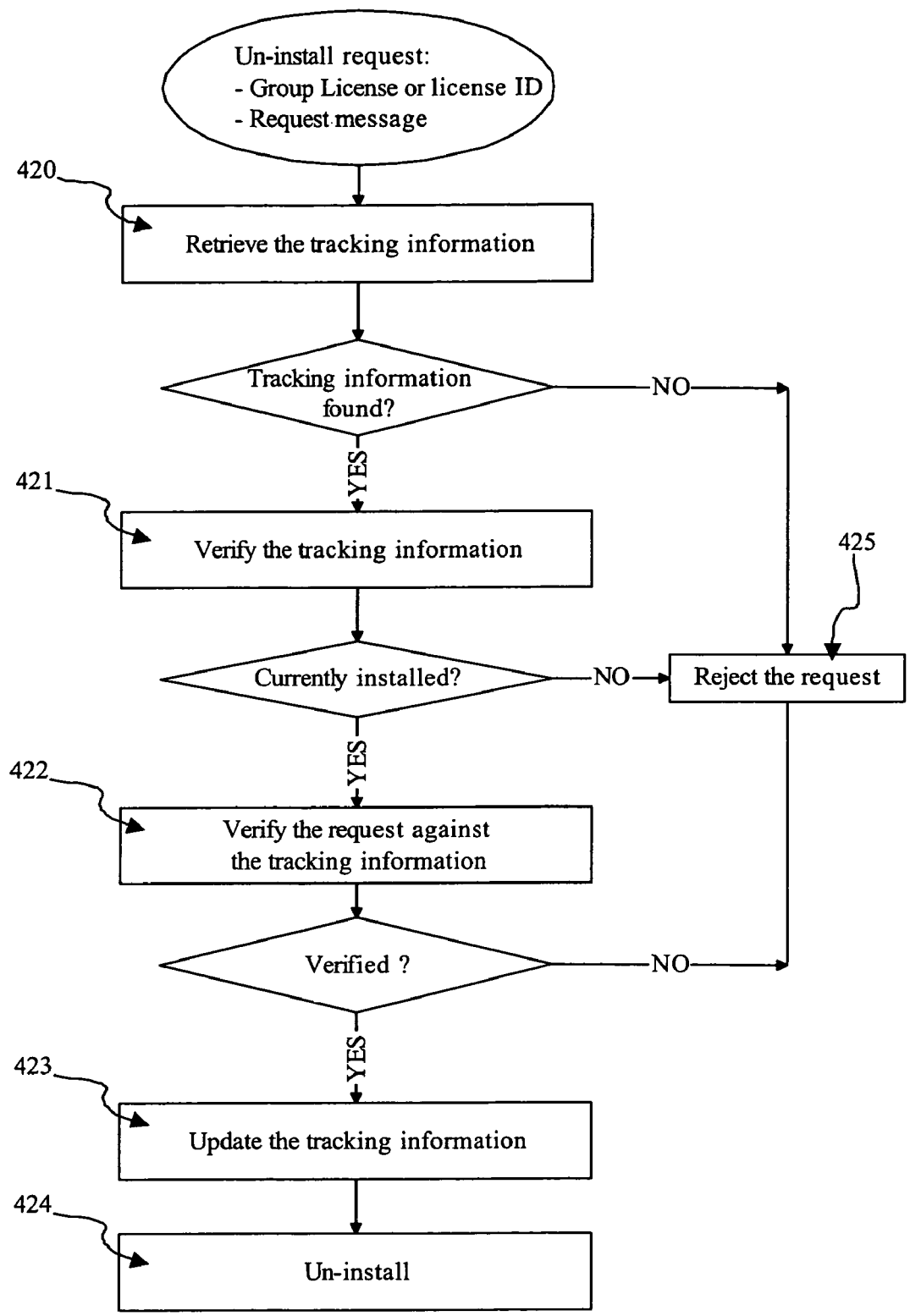
FIG. 33 illustrates the process of un-installing a group license.

FIG. 33 illustrates the process of un-installation. The tracking information is retrieved in step 420 using either the input group license or license ID. The tracking information is then verified in step 421 to ensure that it indicates that the group license is currently installed. In addition, the request is verified against the tracking information at step 422. If the tracking information is not found, the group license is not currently installed, or the tracking information is not verified against the request, the request is rejected in step 425.

If the group license is currently installed, the ID stored in the TCSID is used to verify the request message in step 422. The request message contains the current states of rights for the installed group license. Many-known mechanisms can be used to verify the request message. For example, the request message may be signed by the TCS, and the TCSID may contain the TCS's key, which is used to verify the TCS's signature. If TCS's signature can be verified, the request is authentic. Otherwise, the request for un-installation cannot be trusted.

If the authenticable message and the certified current states of rights are verified, the TCI updates the tracking information at step 423 with the current states of rights for the group license and marks the tracking information as un-installed in step 424 with the certified current states of rights.

Tracking Component for Sharing (TCS)

This component tracks the states of rights for the installed group licenses. Once installed, the group license is bound to a TCS. The advantage of binding to a TCS is to ensure that only one set of states of rights is maintained. This enables many different group license devices to process a rights sharing request and issue a shared license without causing a conflict in the states of rights for the group license. For example, in a home network, any group license device that can connect to the device where the TCS is installed can issue a shared license for use by devices in the home network.

Figure 34:
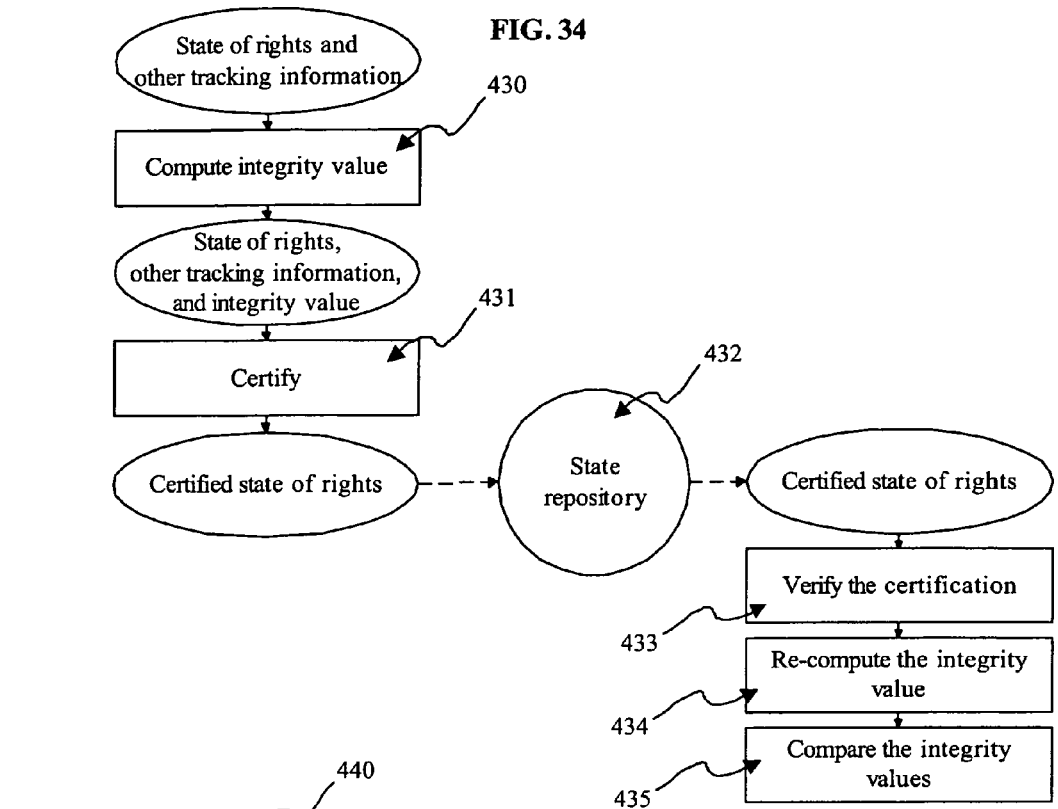
FIG. 34 illustrates the process of certifying and verifying the state of rights.

When a group license is installed, the authenticable ID of the TCS (the TCSID) is retrieved and made available to the TCI. The TCSID is used later to authenticate the request message for un-installation. Once installed, the states of rights for the group license returned by the TCI are used to initialize the states of rights stored in the TCS. To further enhance the security, the TCS may sign the states of rights and other information before storing them in the TCS. FIG. 34 illustrates the process of signing, certifying, and verifying the states of rights before storing them in and after retrieving them from the TCS.

When an installed group license is uninstalled, the TCS generates a request message, which is an authenticable message that contains the current states of rights of the un-installed group license. Then, the current states of rights are passed to the target TCI for un-installation. Whenever the installed license is processed for usage, sharing, integration, the TCS is updated with the new states of rights if those states have changed.

In some applications, the states of rights may not be stored on the device where the TCS is installed. No matter where the states of rights are kept, they must be certified by the TCS so that they can be trusted. For example, the states of rights can be stored within the group license. In this case, the group license itself operates as a repository. When the state of rights changes as the result of creating or integrating a shared license, the group license is also changed. The group license with the new state of rights must be certified by the target TCS. The certified group license becomes the new group license and replaces the previous group license. Once created, the new group license is bound to the same TCS as the previous group license, and the previous group license is unbound from the TCS. Both the new group license and the previous group license may share the same ID. If so, installation of the previous group license is transferred to the new group license Installation Component The installation component installs or un-installs group licenses to a TCI and binds or un-binds the installed group licenses with a TCS. The binding process initializes the states of rights for the installed group licenses to a TCS so that all authorized sharing components can manage and track the states of rights. Installing a group license to a TCI ensures that the installed group license cannot be further installed and bound to another TCS. This prevents the rights granted in the group license from being duplicated or multiplied on multiple TCSes. For example, if a group license granting two copies of the movie A is bound to two different TCSes, each TCS initializes the state for the granted rights to two. This means that each TCS will allow sharing of two copies, thus violating the terms and conditions of the group license.

When the group license is acquired or installed, the ID of the tracking component for installation (TCI) must be communicated to the installation component so that it can request installation from the proper TCI. There are many methods for conducting this communication, such as encoding the ID or address of the TCI in the issued group license, obtaining the ID or address of the TCI via some known protocol, using an agreement between the group license rights grantor and grantee, and so on. In some applications, the TCI may be part of the group license rights grantor's system. In other applications, the TCI may be part of the group license rights grantee's system. In still other applications, the TCI may be an independent service.

As shown in FIG. 34, the process of binding registers the initial the state of rights for the group license with the TCS to which the group license is bound. In steps 430 and 431, an integrity value is computed for the state of rights, which is then certified. Once the state of rights has been initialized and certified, they are stored in a state repository 432. The TCS then manages and tracks the state of rights each time the group license is used. Some applications or configurations may combine the functions of the TCS and TCI into one component, while others may separate these functions into different components. For example, the authorization server X of the system Z that issues the group license for the organization Y acts as a TCI, while the authorization server Z within the organization Y acts as a TCS. However if the authorization server Z of the organization Y is certified for trust compliance by the system Z, then Z may be allowed to function as both an TCI and TCS.

As disclosed above, the installation binds the group license to a TCS so that the states of rights can be initialized and managed. For example, the certification can be verified at step 433, the integrity value can be re-computed at step 434, and the integrity values can be compared at step 435. However, the group license can be stored on any device as long as the device that processes the group license for sharing or use can interact with the TCS so that the states of rights of the group license can properly managed.

The following sections describe group license installation and un-installation in more detail.

Group License Installation

The installation process must request authorization from the TCI to ensure that group license is not currently installed and to obtain the current states of rights. The installation process initializes the TCS with the current states of rights for the group license.

Figure 35:
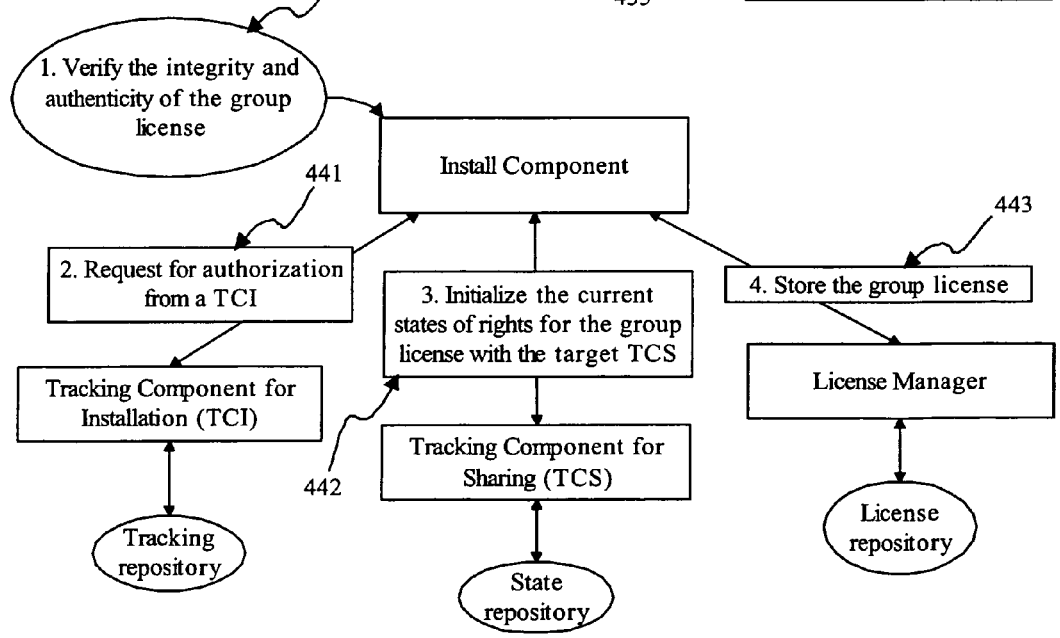
FIG. 35 illustrates the process of installing a group license.

FIG. 35 illustrates the group license installation process, which consists of the following steps. The first step 440 is to verify the integrity and authenticity of the group license, and the state of rights for the group license. Verifying the group license's integrity ensures that it has not been tampered with, while verifying the group license's authenticity ensures that it was issued by a trustworthy source. The methods for verifying integrity and authenticity depend on the representation of the group license. The most common method uses a digital signature to ensure the group license's integrity and a digital certificate to ensure the group license's authenticity. However, different applications may employ different methods to ensure the integrity and authenticity of the group license. If verifying the state of rights for the group license determines that the current state of any conditions indicates that the condition has expired, the group license is not processed for installation.

Figure 36:
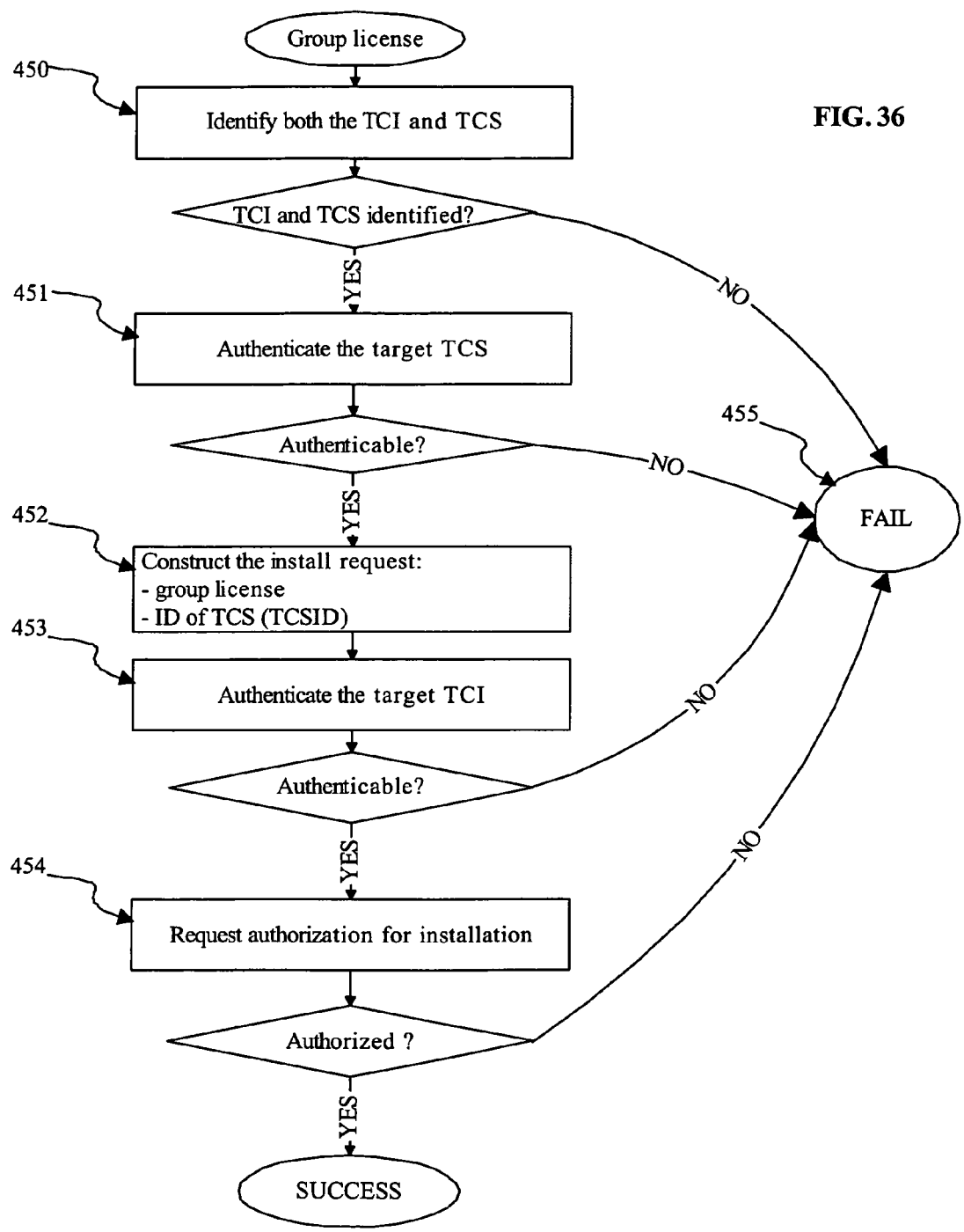
FIG. 36 illustrates the process of constructing and authorizing an installation request.

The next step 441 is to request authorization from the target TCI. This step identifies the target TCI and TCS. Once both TCI and TCS are identified, the request for installation is constructed. Then, the TCS is authenticated and its TCSID is retrieved to construct the installation request. As illustrated in FIG. 36, the request for authorization with the target TCI consists the group license and the TCSID of the TCS. The TCSID is used later to authenticate a request for un-installation. The TCI may be external to or part of the organization to which the group license is granted. The TCI verifies that the requested group license has not been installed already at the time the installation request. Once the installation request is authorized, the current state of rights for the group license is returned and the group license cannot be installed again until it is un-installed. Thus, installation effectively prevents multiple installations of a group license.

The third step 442 is to initialize the current states of rights for the installed group license with the target TCS. The TCS can be specified in advance (such as in the group license) or obtained via some protocol or agreement. The process of initializing the state of rights for the installed group license with the TCS enables the TCS to track the states of rights for the group license every time these states are changed.

The fourth step 443 is to store the installed group license is a license repository. The license repository is independent from the TCS to which the group license is bound, although the license repository may be part of the TCS in some configurations.

FIG. 36 illustrates the process of constructing and authorizing an installation request. First, both the TCI and TCS of the group license are identified in step 450. If the identification is successful, the target TCS is authenticated in step 451. If the target TCS is authenticable, the group license and the TCSID of the install request are constructed in step 452. Then, the target TCI is authenticated at step 453. If the target TCI is authenticable, the next step 454 is to request authorization for installation. If the request is authorized, the installation request is a success. If any of the above steps fail, the request fails in step 455.

Group License Un-Installation

Un-installation un-installs the group license from the target TCI and releases the tracking of the un-installed group license from a TCS. Once un-installed, the group license cannot be used until it is re-installed. The process of un-installation consists of the steps of verifying the request for un-installation, releasing the tracking of the group license from the target TCS, and un-installing the group license from the TCI. If the request for unbinding succeeds, the TCS returns an authenticable message with the current states of rights of the un-installed group license. The authenticable message is sent to the TCI for the un-installation request in the next step. In addition, the request for un-installation contains a group license or group license ID and the authenticable message returned by the TCS, which contains the certified current state of rights. The TCI uses the TCSID of the TCS, which was previous stored at the TCI, to verify the TCS's authenticable message and the current state of rights. If the request succeeds, the TCI updates the tracking information to indicate that the group license is un-installed with the certified current state of rights. The request for un-installation fails if the group license is not currently installed with the TCI or the authenticable message cannot be verified.

Sharing Component

The sharing component creates (derives) shared licenses for sharing or use by authorized principals and integrates shared licenses back to the installed group license from which they were derived.

The process of creating and integrating shared license requires the authorization of the TCS to which the installed group license is bound. The TCS manages the state of rights of the installed group license that the sharing component needs to validate a sharing request against a group license. If the current state of rights indicates that the sharing request is allowed, the shared license is created and made available to the trust component for trust certification, if required. Then, the current state of rights of the group license is updated to reflect the state of rights and the initial states in the newly created shared license.

Depending on the sharing request, different methods may be used to create the state of rights and initial states in the shared license and to update the current state of rights of the installed group license, as described above.

When a shared license is returned and integrated into the originating group license, the sharing component validates the integration request and the group license to which the shared license will be returned. If the return is allowed, the sharing component sends the request to the TCS to which the group license is bound to update the current states of rights of the group license.

The following sections describe the processes of deriving a shared license and integrating a shared license back into the originating installed group license in more detail.

Rights Derivation

Rights derivation is a process of creating a shared license from an installed group license. The request for sharing may be directly from a rights grantee or indirectly from the device on which the shared license will be consumed. If the target consumption device is not known at the time of request, the shared license resulting from the request is not bound to any consumption device. In this case, the shared license must be bound before it can be used for either consumption or further sharing.

Figure 37:
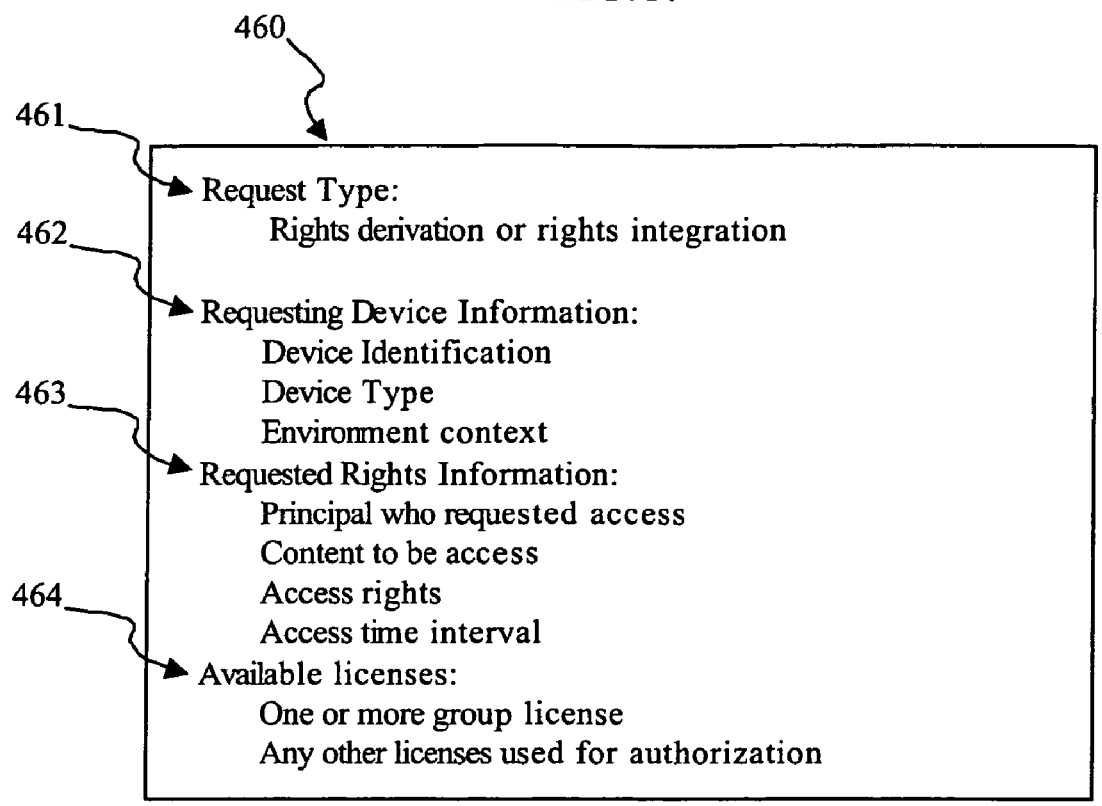
FIG. 37 illustrates the information that is typically part of a sharing request.

FIG. 37 illustrates the information 460 that is typically part of a sharing request. The request type 461 indicates whether this request is for rights derivation or integration. Derivation is a request to create sub-right. Integration is a request to return a sub-right. The requesting device information 462 identifies the rights consumption device and is used to verify that the device is authorized to receive the requested sub-rights. The device information is optional. The requested rights information 463 identifies the rights to be shared from the group license. The available licenses 464 include a group license that may grant the request and other licenses necessary for authorizing the request and for issuing a license to satisfy the request.

Upon receiving a sharing request, the rights consumption device performs a set of functions in an attempt to produce a license satisfying the request. Such functions include verifying the request against the target group license, verifying the group license and related licenses, requesting the target TCS for the current states of rights of the group license related to the sharing request, processing the request, and creating a shared license if authorized. If the request is authorized, the state of rights of the target group license in the TCS is updated according to the current state of rights in the originating group license and the initial state of rights in the shared license.

Figure 38:
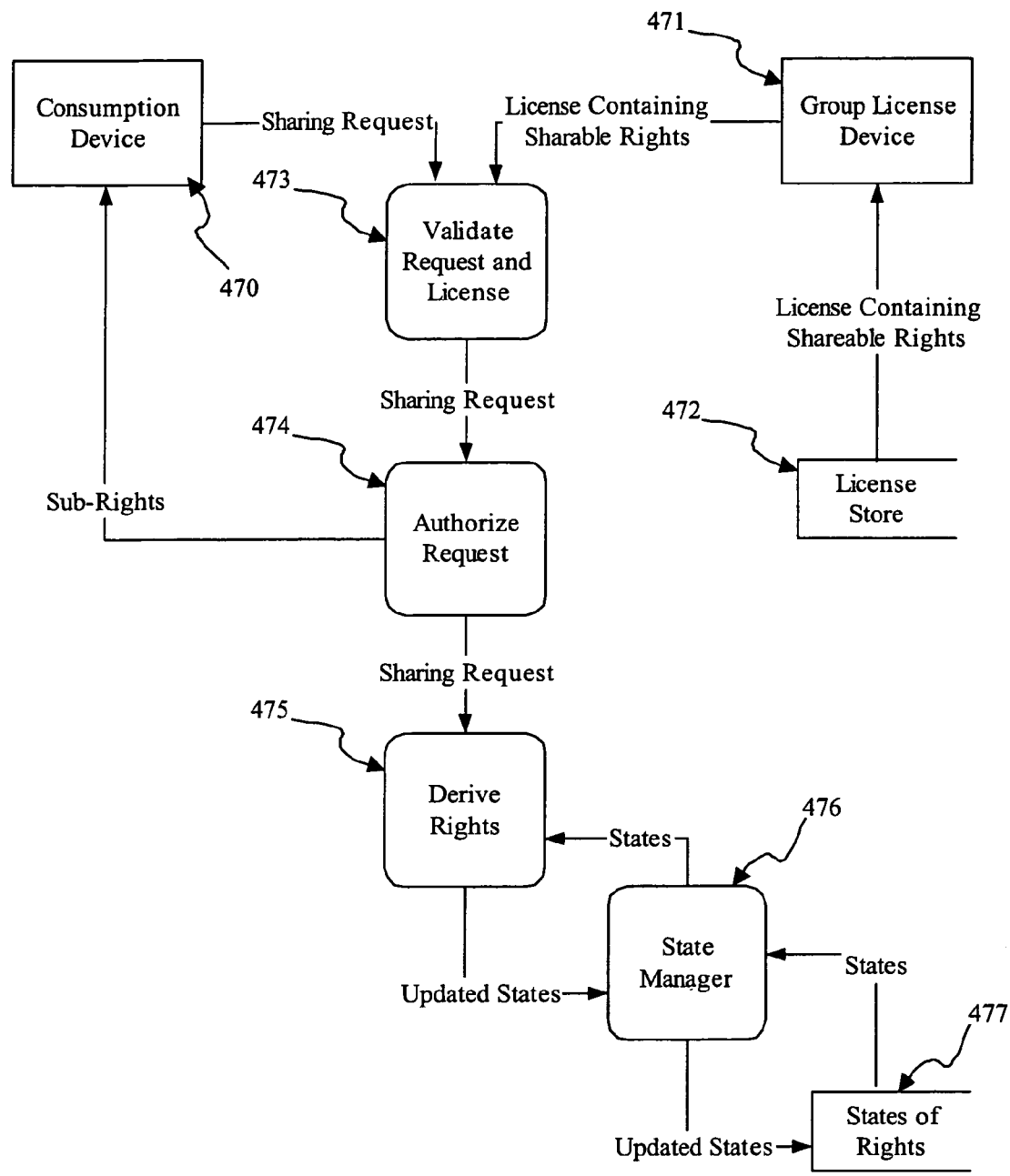
FIG. 38 illustrates an exemplary data flow for processing a sharing request.

FIG. 38 depicts an exemplary data flow for processing a sharing request starting with the sharing component receiving a sharing request and ending with the output of a license containing shared rights. This process consists of a number of components, which are sub-processes and databases. The entire process or any of its components may reside on the group license device where the sharing component is located.

The request is sent from a consumption device component 470 to the group license device 471, where it is typically processed. The group license device 471 contains a sharing component, which is responsible for processing the sharing request. Upon receiving the sharing request, the group license device locates the target group license either by extracting it from the request or from a repository 472. The target group license and the request are validated to ensure their authenticity and integrity in step 473. Information on the identity of the target consumption device is extracted from the request and verified to ensure the consumption device is authorized to make such request. The target consumption device is usually a secondary device that makes the request.

Figure 39:
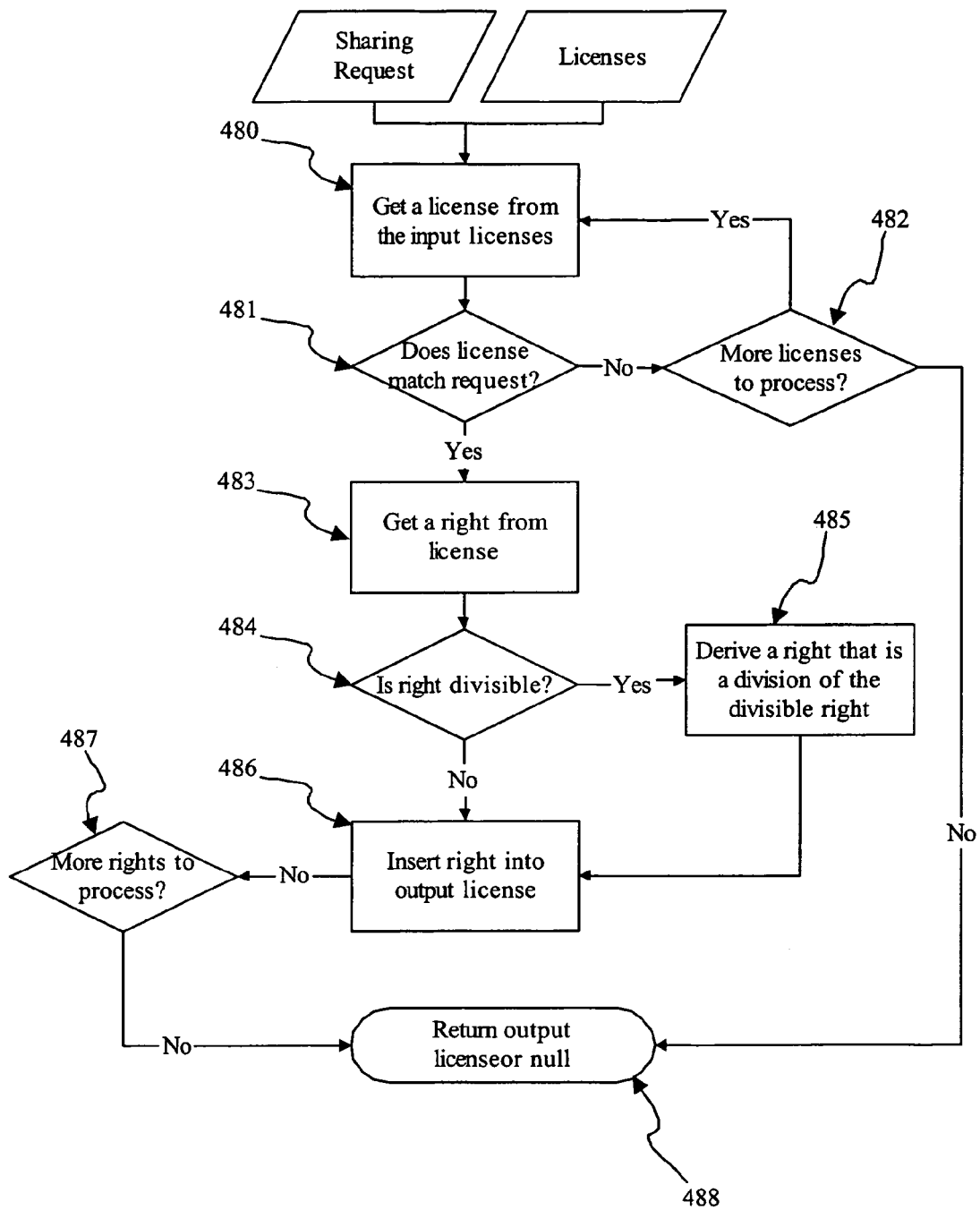
FIG. 39 illustrates the rights derivation process.

A request is made for the current states of rights from the target TCS and the request for sharing is processed in step 474. If the request is authorized, rights are derived at step 475 and the states 477 of the derived right are updated by state manager 476. FIG. 39 illustrates the rights derivation process.

Rights derivation includes the following steps:

Locating the group license and the shareable rights that match the request: This step includes validating the request, locating the group license, identifying the sharable right, validating the license, and so on;

Identifying the set of states associated with the target shareable right;

Validating the request against the current states and original states of the target shareable right;

Creating the shared right; and

Creating a license that contains the shared right. The license can be a new group license that allows an authorized member to create shared rights for other members of the group.

As is shown in FIG. 39, step 480 provides to obtain a license from the input license, and to confirm that the license matched the sharing request at step 481. If not, step 482 provides to determine whether there are more licenses to process. If there are no licenses to process, step 488 provides to return an output of null. If the license matches the request, the next step 483 is to obtain a right from the license and determine, at step 484, if the right is divisible. If so, step 485 provides to derive a right that is a division of the divisible right. Then the devised right, or the in-divisible right, is inserted into the output license at step 486. Step 487 then provides to determine whether there are more rights to process. If not, the output license is returned at step 488.

Rights Integration

Rights integration is a process of integrating a shared license back into the originating group license and creating a new group license as a result. The process of rights integration is similar to the process of rights derivation as disclosed above. The differences between right derivation and right integration are as follows:

In the case of right integration, the state of rights for the target group license is updated to reflect more rights.

In the case of rights integration, the shared license that is integrated becomes invalid. In the case of right derivation, a new-shared license is created.

Consumption Component

The consumption component consumes the consumption license. As disclosed above, a consumption license is also a shared license. However, the consumption license is meant for use rather than sharing. Consumption of a consumption license requires authorization, and such authorization is a known process specified by all DRM systems. The authorization process includes validating the request against the license, authenticating the users and devices, verifying the request against the current states of conditions, updating the current states of conditions if authorized for usage, and so on.

The consumption license is consumed by the consumption device until it expires or is released by the consumption device. Once released, the consumption license can be sent to the sharing component for integration back to the group license from which it was derived.

What is claimed is:

1. A method for deriving a sub-right from a shareable right, the shareable right comprising at least one component, each of which specifies an aspect of the shareable right, said method comprising:
   receiving, by a computing device, a request for a sub-right, wherein the request specifies at least one component, each of which specifies an aspect of the sub-right; and
   deriving, by the computing device, the sub-right comprising the at least one component when the values of the at least one component specified in the request can be derived from the values of the corresponding at least one component of the shareable right, wherein the sub-right is a shareable sub-right from which further sub-rights can be derived.

2. The method of claim 1, wherein the receiving step comprises generating components for the sub-right.

3. The method of claim 1, wherein the receiving step comprises receiving requests for shared licenses creation.

4. The method of claim 1, wherein the deriving step comprises a step of verifying that a component of the sub-right is the corresponding component of the right.

5. The method of claim 1, wherein the deriving step comprises a step of verifying that a component of the sub-right is part of the corresponding component of the right, the latter representing a collection.

6. The method of claim 1, wherein the deriving step comprises a step of verifying a component of the sub-right is an instance of the corresponding component of the right, the latter representing a class.

7. The method of claim 6, wherein the class represents a universe of the component.

8. The method of claim 1, wherein a component can be a principal, an action, a resource, or a condition.

9. The method of claim 8, wherein the right contains a state condition.

10. The method of claim 9, wherein the receiving step comprises apportioning state values for each state condition in the sub-right based on the permissible state values of the corresponding state condition in the right and its current state.

11. The method of claim 10, wherein the apportioning comprises deriving from a state condition specifying a maximum count, wherein the current state of the state condition denotes an accumulated count.

12. The method of claim 10, wherein the apportioning comprises deriving from a state condition specifying a range of values, wherein the current state of the state condition denotes the sub-ranges of the specified range that are no longer available.

13. The method of claim 8, further comprising creating restricted conditions to further restrict the use of a sub-right.

14. The method of claim 1, further comprising the step of updating the right expression after the derivation.

15. The method of claim 14, wherein the updating step comprises the step of updating the states of the right.

16. A system to support rights sharing by enabling the derivation of a sub-right from a shareable right, the shareable right comprising at least one component, each of which specifies an aspect of the shareable right, the system comprising one or more computing devices that execute:
   a receiving module that receives a request for a sub-right, the request specifying at least one component, each of which specifies an aspect of the sub-right;
   a confirmation module that confirms that the values of the at least one component of the sub-right can be derived from the values of the corresponding at least one component of the shareable right; and
   a sharing module that derives the sub-right, wherein the sub-right is a shareable sub-right from which further sub-rights can be derived and the sub-right comprises the at least one component.

17. The system of claim 16, wherein the one or more computing devices further execute:
   an installation module that installs a group license on a device, making it available for sharing; and for uninstalling an installed group license, making it unavailable for sharing on the current device;
   an installation tracking module that tracks the installed/uninstalled group license;
   a tracking module that tracks the states of rights of a group license; and
   a sharing module that:
      creates shared licenses by: (a) receiving a request for sharing; (b) interpreting the installed group license including extracting the values of the states of rights and authorizing the request; and (c) deriving a shared license and for integrating a shared license back to the group license; and
      integrates a shared license to a group license by: (a) verifying the shared license was derived from the group license; and (b) updating the states values of the group license using the state values of the shared license.

18. The system of claim 17, wherein the installation module installs the group license by:
   verifying the integrity and authenticity of the group license;
   verifying that a shareable right in the group license has not been expired;
   verifying with an installation tracking module that the group license has not been installed before;
   using a state tracking module to keep track of the initial states of rights and to later update the states of rights as rights are being used; and
   storing the group license in a license repository.

19. The system of claim 17, wherein the installation module uninstalls the group license by:
   invoking the state tracking module to release the tracking of states of rights of the group license; and
   invoking the installation tracking module, which then updates the tracking information to indicate that uninstalled status of the group license together with its certified states of rights at the time of uninstallation.

* * * * *